(12) United States Patent
Fujiwara et al.

(10) Patent No.: US 7,309,670 B2
(45) Date of Patent: *Dec. 18, 2007

(54) OPTICAL GLASS; PRESS-MOLDING PREFORM AND METHOD OF MANUFACTURING SAME; AND OPTICAL ELEMENT AND METHOD OF MANUFACTURING SAME

(75) Inventors: Yasuhiro Fujiwara, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 10/826,308

(22) Filed: Apr. 19, 2004

(65) Prior Publication Data

US 2004/0266602 A1 Dec. 30, 2004

(30) Foreign Application Priority Data

Apr. 17, 2003 (JP) ............................. 2003-113282
Aug. 28, 2003 (JP) ............................. 2003-304364

(51) Int. Cl.
- C03C 3/21 (2006.01)
- C03C 3/19 (2006.01)
- C03C 4/00 (2006.01)
- C03B 11/00 (2006.01)
- C03B 17/00 (2006.01)

(52) U.S. Cl. ..................... 501/46; 501/45; 501/47; 501/901; 501/903; 65/66; 65/102

(58) Field of Classification Search ............ 501/45–47, 501/901, 903; 65/66, 102
See application file for complete search history.

(56) References Cited

U.S. PATENT DOCUMENTS

| 5,668,066 | A  | * | 9/1997  | Oguma et al. ............... 501/45 |
| 6,225,244 | B1 | * | 5/2001  | Oguma ......................... 501/45 |
| 6,333,282 | B1 | * | 12/2001 | Nakahata et al. ............ 501/45 |
| 6,743,743 | B2 | * | 6/2004  | Sato ............................. 501/47 |
| 6,786,064 | B2 | * | 9/2004  | Hayashi et al. ............ 65/32.1 |
| 6,875,714 | B2 | * | 4/2005  | Izuki ........................... 501/45 |
| 6,995,101 | B2 | * | 2/2006  | Zou et al. ................... 501/46 |
| 7,060,640 | B2 | * | 6/2006  | Ogino et al. ................ 501/45 |
| 7,157,391 | B2 | * | 1/2007  | Kasuga et al. .............. 501/45 |
| 2002/0073735 | A1 | * | 6/2002  | Hayashi et al. ............. 65/32.1 |
| 2004/0259714 | A1 | * | 12/2004 | Fujiwara et al. ............ 501/45 |
| 2005/0032621 | A1 | * | 2/2005  | Zou et al. ................... 501/46 |
| 2005/0164862 | A1 | * | 7/2005  | Shiraishi .................... 501/45 |
| 2006/0058171 | A1 | * | 3/2006  | Izuki ........................... 501/47 |
| 2006/0081010 | A1 | * | 4/2006  | Zou et al. ................... 65/385 |
| 2007/0027016 | A1 | * | 2/2007  | Ogino et al. ................ 501/45 |

FOREIGN PATENT DOCUMENTS

EP    1 078 894 A2    2/2001

OTHER PUBLICATIONS

Patent Abstracts of Japan, JP 08-104537, Apr. 23, 1996.
Patent Abstracts of Japan, JP 2003-160355, Jun. 3, 2003.

* cited by examiner

Primary Examiner—J. A. Lorengo
Assistant Examiner—Elizabeth A Bolden
(74) Attorney, Agent, or Firm—Sughrue Mion, PLLC (57) ABSTRACT

The present invention relates to optical glass having a high refractive index, high dispersion, and a low glass transition temperature; a preform comprised of the optical glass for precision press-molding and a method of manufacturing the same; and an optical element comprised of the optical glass and a method of manufacturing the same. An example of the optical glasses for precision press molding is characterized by comprising essential components in the form of $P_2O_5$, $Nb_2O_5$, $WO_3$, $TiO_2$, $Bi_2O_3$, $Li_2O$, and $Na_2O$; comprising optional components in the form of $B_2O_3$, $BaO$, $ZnO$, $K_2O$, $Sb_2O_3$, and $As_2O_3$; where the content of $Bi_2O_3$ exceeds 4 weight percent but does not exceed 15 molar percent; the content of $Li_2O$ exceeds 3 weight percent but does not exceed 15 weight percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

34 Claims, 1 Drawing Sheet

*FIG. 1*

OPTICAL GLASS; PRESS-MOLDING PREFORM AND METHOD OF MANUFACTURING SAME; AND OPTICAL ELEMENT AND METHOD OF MANUFACTURING SAME

TECHNICAL FIELD

The present invention relates to optical glass having a high refractive index, high dispersion, and a low glass transition temperature; a preform comprised of the optical glass for precision press-molding and a method of manufacturing the same; and an optical element comprised of the optical glass and a method of manufacturing the same.

TECHNICAL BACKGROUND

Due to the extremely high efficiency afforded to optical design, attempts have been made to manufacture optical elements such as lenses, particularly aspherical lenses, out of high refractive index, high-dispersion optical glass by precision press molding. In precision press molding, reducing the temperature during press molding effectively extends the service life of the pressing mold. Thus, large amounts of lead oxide had been incorporated into conventional glass for precision press molding having a high refractive index and high dispersion to impart a low softening property. For example, Japanese Unexamined Patent Publication (KOKAI) Heisei No. 1-308843 (Reference 1) discloses a glass containing 30-58 weight percent of PbO. Further, Japanese Unexamined Patent Publication (KOKAI) Heisei 7-247135 (Reference 2) discloses a glass containing 25-54 weight percent of PbO. However, precision press molding is normally conducted in an inert atmosphere or weakly reducing atmosphere to prevent oxidation of the pressing mold, particularly the molding surface. During press molding of the glasses of the above-cited references, which contain large lead oxide components, the lead oxide at the surface of the glass is reduced, precipitating as metallic lead on the glass surface. This metallic lead then adheres to the pressing mold, not only compromising the precision of the molding surface of the pressing mold, but also requiring maintenance to remove it. Such maintenance is unsuited to mass production. Further, the melting of the glasses disclosed in References 1 and 2 above containing large amounts of lead oxide poses environmental problems. Thus, the glasses disclosed in References 1 and 2 above are unsuitable for precision press molding.

Among the optical glasses that are currently commercially available, there are optical glasses of high refractive index and high dispersion that have been lightened without incorporating lead oxide, such as the glass disclosed in Japanese Unexamined Patent Publication (KOKAI) Showa No. 62-3103 (Reference 3). However, when these glasses are employed in precision press molding, a high precision press molding temperature of greater than or equal to 650° C. must be employed, resulting in substantial deterioration of the precision pressing mold material and greatly complicating mass production. Such glasses are thus impractical. Further, since the glasses themselves are unstable, crystals tend to precipitate in the glass during precision press molding; even when a mold material capable of withstanding high temperatures is employed, there is a problem in that the yield of precision press-molded products is extremely low. That is, the higher the precision press-molding temperature, the greater the problems with oxidation and deterioration of the mold material, the more difficult it becomes to maintain the precision of the molding surface, and the more difficult it is to mass produce optical elements by precision press molding. Accordingly, there is a need to develop a high refractive index, high-dispersion optical glass for precision press molding with as low a glass transition temperature and sag temperature as possible without incorporating lead.

For example, Japanese Unexamined Patent Publication (KOKAI) Heisei No. 5-51233 (Reference 4) discloses a high refractive index, high-dispersion optical glass the composition of which, denoted as weight percentages, is 10 to 20 percent of $SiO_2$, 3 to 15 percent $GeO_2$, 0 to 7 percent $B_2O_3$, where the combined quantity of $SiO_2$, $GeO_2$, and $B_2O_3$ is from 20 to 27 percent; 19 to 29 percent $TiO_2$, 17 to 29 percent $Nb_2O_5$, 0 to 7 percent BaO, where the combined quantity of $Nb_2O_5$, $TiO_2$, and BaO is 44 to 54 percent; 0 to 3 percent $Li_2O$, 7 to 18 percent $Na_2O$, 0 to 22 percent $K_2O$, 0 to 20 percent $Cs_2O$, where the combined quantity of $Li_2O$, $Na_2O$, $K_2O$, and $Cs_2O$ is 24 to 33 percent; with a sag temperature of less than or equal to 550° C., a refractive index of greater than or equal to 1.76, and an Abbé number of less than or equal to 26.5. Although this glass achieves the objective of a low sag temperature, the use of a large amount of $TiO_2$ causes coloration of the glass, and there are problems with the stability and melting properties of the glass during mass production. Further, the essential component $GeO_2$ is extremely expensive, precluding the low-cost production of optical glass lenses. Still further, the glass described in Reference 4 has a high liquid phase temperature and a strong tendency to devitrify near the softening point, greatly complicating the production of glass preforms for precision press molding and rendering this glass unsuited to precision press molding.

Ordinary precision press molding is conducted within a temperature range of about 20 to 60° C. higher than the sag temperature of the glass. When the glass sag temperature exceeds 600° C., the pressing temperature becomes 620° C. or more, and OH radicals adhering to the surface of the glass react with the mold material, which ends up decomposing. This decomposition reaction leaves numerous bubbles on the surface of the press-molded glass lens, precluding the maintenance of the precision of the transferred surface of the precision press molded lens and damaging the surface of the molding material, which are clearly unsuited to mass production.

Accordingly, the present invention has for its object to provide an optical glass having a high refractive index and high dispersion that is suited to precision press molding; a preform comprised of this glass that is suited to precision press molding and a method of manufacturing the same; and an optical element comprised of this optical glass and a method of manufacturing the same.

SUMMARY OF THE INVENTION

The above-stated problem is resolved by the following means:

(1) An optical glass for precision press molding characterized by comprising essential components in the form of $P_2O_5$, $Nb_2O_5$, $WO_3$, $TiO_2$, $Bi_2O_3$, $Li_2O$, and $Na_2O$; comprising optional components in the form of $B_2O_3$, BaO, ZnO, $K_2O$, $Sb_2O_3$, and $As_2O_3$; where the content of $Bi_2O_3$ exceeds 4 weight percent but does not exceed 15 molar percent; the content of $Li_2O$ exceeds 3 weight percent but does not exceed 15 weight percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

(2) An optical glass for precision press molding characterized by comprising essential components in the form of $P_2O_5$, $Nb_2O_5$, $WO_3$, $TiO_2$, $Bi_2O_3$, $Li_2O$, $Na_2O$, and $B_2O_3$; comprising optional components in the form of BaO, ZnO, $K_2O$, $Sb_2O_3$, and $As_2O_3$; where the content of $Bi_2O_3$ is from 0.5 to 15 molar percent; the content of $Li_2O$ exceeds 3 weight percent but does not exceed 15 weight percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

(3) An optical glass for precision press molding characterized by comprising essential components in the form of $P_2O_5$, $Nb_2O_5$, $WO_3$, $TiO_2$, $Bi_2O_3$, $Li_2O$, $Na_2O$; comprising optional components in the form of $B_2O_3$, BaO, ZnO, $K_2O$, $Sb_2O_3$, and $As_2O_3$; where the content of $WO_3$ is less than 15 weight percent; the content of $Bi_2O_3$ is from 0.5 to 15 molar percent; the content of $Li_2O$ exceeds 3 weight percent but does not exceed 15 weight percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

(4) An optical glass characterized by comprising 16 to 30 molar percent of $P_2O_5$, 5 to 25 molar percent of $Nb_2O_5$, 1 to 40 molar percent of $WO_3$, 1 to 10 molar percent of $TiO_2$, 0.5 to 15 molar percent of $Bi_2O_3$ (where $Bi_2O_3$ exceeds 4 weight percent and the combined quantity of $Nb_2O_5$, $WO_3$, $TiO_2$, and $Bi_2O_3$ is from 25 to 45 molar percent), 4 to 25 molar percent of $Li_2O$ (but exceeding 3 weight percent), 4 to 25 molar percent of $Na_2O$, 0 to 15 molar percent of $K_2O$ (where the combined quantity of $Li_2O$, $Na_2O$ and $K_2O$ is less than or equal to 42 molar percent), 0 to 15 molar percent of $B_2O_3$, 0 to 15 molar percent of BaO, 0 to 12 molar percent of ZnO, 0 to 1 molar percent of $Sb_2O_3$, and 0 to 1 molar percent of $As_2O_3$; and in that the combined quantity of the above components is greater than or equal to 98 molar percent.

(5) An optical glass characterized by comprising 16 to 30 molar percent of $P_2O_5$, 5 to 25 molar percent of $Nb_2O_5$, 1 to 40 molar percent of $WO_3$, 1 to 10 molar percent of $TiO_2$, 0.5 to 15 molar percent of $Bi_2O_3$ (where the combined quantity of $Nb_2O_5$, $WO_3$, $TiO_2$, and $Bi_2O_3$ is from 25 to 45 molar percent), 4 to 25 molar percent of $Li_2O$ (but exceeding 3 weight percent), 4 to 25 molar percent of $Na_2O$, 0 to 15 molar percent of $K_2O$ (where the combined quantity of $Li_2O$, $Na_2O$ and $K_2O$ is less than or equal to 42 molar percent), more than 0 but less than or equal to 15 molar percent of $B_2O_3$, 0 to 15 molar percent of BaO, 0 to 12 molar percent of ZnO, 0 to 1 molar percent of $Sb_2O_3$, and 0 to 1 molar percent of $As_2O_3$; and in that the combined quantity of the above components is greater than or equal to 98 molar percent.

(6) An optical glass characterized by comprising 16 to 30 molar percent of $P_2O_5$, 5 to 25 molar percent of $Nb_2O_5$, 1 to 40 molar percent of $WO_3$ (but less than 15 weight percent), 1 to 10 molar percent of $TiO_2$, 0.5 to 15 molar percent of $Bi_2O_3$ (where the combined quantity of $Nb_2O_5$, $WO_3$, $TiO_2$, and $Bi_2O_3$ is from 25 to 45 molar percent), 4 to 25 molar percent of $Li_2O$ (but exceeding 3 weight percent), 4 to 25 molar percent of $Na_2O$, 0 to 15 molar percent of $K_2O$ (where the combined quantity of $Li_2O$, $Na_2O$ and $K_2O$ is less than or equal to 42 molar percent), 0 to 15 molar percent of $B_2O_3$, 0 to 15 molar percent of BaO, 0 to 12 molar percent of ZnO, 0 to 1 molar percent of $Sb_2O_3$, and 0 to 1 molar percent of $As_2O_3$; and in that the combined quantity of the above components is greater than or equal to 98 molar percent.

(7) The optical glass according to any of the above (4) to (6) wherein the refractive index (nd) is from 1.75 to 2.0 and the Abbé number (vd) is from 18 to 30.

(8) A precision press molding preform comprised of the optical glass according to any of the above (1) to (7).

(9) A precision press molding preform characterized:

by being comprised of an optical glass having essential components in the form of $P_2O_5$, $Nb_2O_5$, $WO_3$, $TiO_2$, $Bi_2O_3$, $Li_2O$, and $Na_2O$; optional components in the form of $B_2O_3$, BaO, ZnO, $K_2O$, $Sb_2O_3$, and $As_2O_3$; where the content of $Bi_2O_3$ exceeds 4 weight percent but does not exceed 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30;

in that a gob of the glass in a molten state has been solidified; and in that the preform have been shaped without mechanical processing.

(10) A preform for precision glass molding characterized:

by being comprised of an optical glass having essential components in the form of $P_2O_5$, $Nb_2O_5$, $WO_3$, $TiO_2$, $Bi_2O_3$, $Li_2O$, $Na_2O$, and $B_2O_3$; optional components in the form of BaO, ZnO, $K_2O$, $Sb_2O_3$, and $As_2O_3$; where the content of $Bi_2O_3$ is from 0.5 to 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30;

in that a gob of the glass in a molten state has been solidified; and in that the preform has been shaped without mechanical processing.

(11) A preform for precision glass molding characterized:

by being comprised of an optical glass having essential components in the form of $P_2O_5$, $Nb_2O_5$, $WO_3$, $TiO_2$, $Bi_2O_3$, $Li_2O$, $Na_2O$; comprising optional components in the form of $B_2O_3$, BaO, ZnO, $K_2O$, $Sb_2O_3$, and $As_2O_3$; where the content of $WO_3$ is less than 15 weight percent; the content of $Bi_2O_3$ is from 0.5 to 15 molar percent; the content of $Li_2O$ exceeds 3 weight percent but does not exceed 15 weight percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30;

in that a gob of the glass in a molten state has been solidified; and in that the preform has been shaped without mechanical processing.

(12) A method of manufacturing a press molding preform characterized by comprising the steps of:

separating a prescribed weight of glass melt from a glass melt flow, and forming a press molding preform comprised of this prescribed weight of the optical glass according to any of the above (1) to (7).

(13) An optical element comprised of the optical glass according to any of the above (1) to (7), which is in the form of a precision press-molded article.

(14) An optical element obtained by precision press molding the precision press molding preform according to any of the above (8) to (11) or a precision press molding preform manufactured by the method of manufacturing according to the above (12).

(15) A method of manufacturing an optical element characterized in that the precision press molding preform according to any of the above (8) to (11) or a precision press molding preform manufactured by the method of manufacturing according to the above (12) is heated and precision press molded.

(16) The method of manufacturing an optical element according to the above (15) wherein the preform is introduced into a pressing mold, both the pressing mold and preform are heated together, and precision press molding is conducted.

(17) The method of manufacturing an optical element according to the above (15) wherein the pressing mold and preform are separately heated, the preheated preform is introduced into the pressing mold, and precision press molding is conducted.

The present invention provides optical glass having a high refractive index and high dispersion properties, a low-temperature softening property, and good resistance to devitrification.

The present invention also provides a press molding preform (preform for press molding) comprised of the above optical glass and permitting stable precision press molding; and a method of manufacturing the same.

The present invention further provides an optical element such as an asymmetrical lens comprised of the optical glass having a high refractive index and high dispersion properties by heating and precision press molding the above preform; and a method of manufacturing an optical element permitting the efficient manufacturing of this optical element.

BEST MODE OF IMPLEMENTING THE INVENTION

[Optical Glass and Method of Manufacturing Same]

To achieve the above-stated objects, the present inventors conducted various tests, resulting in the discovery that the incorporation of $Bi_2O_3$ and $WO_3$ into a $P_2O_5$—$Nb_2O_5$—$TiO_2$—$Li_2O$—$Na_2O$-based glass permitted the development of a high refractive index, high dispersion optical glass for precision press molding having a transition temperature (Tg) of less than or equal to 530° C., a sag temperature (Ts) of less than or equal to 560° C., a high refractive index (nd) of greater than or equal to 1.75, a low Abbé number (vd) of less than or equal to 30, good stability, and good mass production properties; the present invention was devised on that basis. A first aspect (glass (1) hereinafter) and a second aspect (glass (2) hereinafter) of the optical glass of the present invention will be described. Three variations of glass (1) denoted as glasses (1-1) to (1-3) will be described, and three variations of glass (2) denoted as glasses (2-1) to (2-3) will be described.

(Glass (1))

Glass (1) is an optical glass for precision press molding characterized by comprising essential components in the form of $P_2O_5$, $Nb_2O_5$, $WO_3$, $TiO_2$, $Bi_2O_3$, $Li_2O$, and $Na_2O$; comprising optional components in the form of $B_2O_3$, BaO, ZnO, $K_2O$, $Sb_2O_3$, and $As_2O_3$; where the content of $Bi_2O_3$ is from 0.5 to 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

Glass (1-1) is glass (1) wherein the content of $Bi_2O_3$ exceeds 4 weight percent and is less than or equal to 15 molar percent and the content of $Li_2O$ exceeds 3 weight percent but does not exceed 15 weight percent. The incorporation of a relatively large amount of $Bi_2O_3$ enhances glass stability and weatherability.

Glass (1-2) is glass (1) wherein $B_2O_3$ is incorporated as an essential component and the content of $Li_2O$ exceeds 3 weight percent but does not exceed 15 weight percent. The incorporation of $B_2O_3$ both enhances the melt property and more effectively suppresses bubbling of the glass during precision press molding, as will be set forth below.

Glass (1-3) is glass (1) wherein the quantity of $WO_3$ is less than 15 weight percent and the quantity of $Li_2O$ exceeds 3 weight percent but does not exceed 15 weight percent. Employing a relatively small amount of $WO_3$ facilitates the direct molding of a preform from the glass melt and more effectively suppresses bubbling of the glass during precision press molding.

In glass (1), to maintain or enhance weatherability and stability while imparting a high refractive index and a high dispersion characteristic, the content of $Bi_2O_3$ is desirably kept to within from 0.5 to 15 molar percent in glasses (1-2) and (1-3). In each of glasses (1-1) to (1-3), the content of $Bi_2O_3$ desirably exceeds 2 molar percent but does not exceed 15 molar percent.

In glass (1), $P_2O_5$, $Nb_2O_5$, $WO_3$, $TiO_2$, $Bi_2O_3$, $Li_2O$, and $Na_2O$ are essential components to impart stability, a low softening property, a high refractive index, and a high dispersion characteristic.

In glass (1), $B_2O_3$, BaO, ZnO, $K_2O$, $Sb_2O_3$, and $As_2O_3$ are incorporated as optional components to enhance the melt property and quality; impart a low softening property, a high refractive index, and a high dispersion characteristic; and prevent bubbling of the glass during press molding. However, in glass (1-2), $B_2O_3$ is incorporated as an essential component.

The combined quantity of $Nb_2O_5$, $WO_3$, $TiO_2$, and $Bi_2O_3$ is from 25 to 45 molar percent. When 45 percent is exceeded, molten glass yielding a high refractive index and a high dispersion characteristic tends to develop color and devitrification stability deteriorates. At less than 25 molar percent, it becomes difficult to achieve the desired optical characteristics.

A combined quantity of $Li_2O$, $Na_2O$, and $K_2O$ of less than or equal to 42 molar percent yields a low softening property suited to precision press molding together with the desired optical constants and weatherability.

A combined quantity of the essential components and optional components of greater than or equal to 98 molar percent improves the various above-described characteristics.

Glass (1) of the present invention has a high refractive index and a high dispersion characteristic. The high refractive index targeted by the present invention is a refractive index (nd) of from 1.75 to 2.0 and the high dispersion characteristic targeted by the present invention is an Abbé number (vd) of from 18 to 30.

(Glass (2))

Glass (2) is an optical glass characterized by comprising 16 to 30 molar percent of $P_2O_5$, 5 to 25 molar percent of $Nb_2O_5$, 1 to 40 molar percent of $WO_3$, 1 to 10 molar percent of $TiO_2$, 0.5 to 15 molar percent of $Bi_2O_3$ (where the combined quantity of $Nb_2O_5$, $WO_3$, $TiO_2$, and $Bi_2O_3$ is from 25 to 45 molar percent), 4 to 25 molar percent of $Li_2O$, 4 to 25 molar percent of $Na_2O$, 0 to 15 molar percent of $K_2O$ (where the combined quantity of $Li_2O$, $Na_2O$ and $K_2O$ is less than or equal to 42 molar percent), 0 to 15 molar percent of $B_2O_3$, 0 to 15 molar percent of BaO, 0 to 12 molar percent of ZnO, 0 to 1 molar percent of $Sb_2O_3$, and 0 to 1 molar percent of $As_2O_3$; and in that the combined quantity of the above components is greater than or equal to 98 molar percent.

Glass (2-1) is glass (2) wherein the content of $Bi_2O_3$ exceeds 4 weight percent but does not exceed 15 molar percent and the quantity of $Li_2O$ is from 4-25 molar percent (but exceeds 3 weight percent). The incorporation of a relatively large quantity of $Bi_2O_3$ yields a glass of greater stability and weatherability.

Glass (2-2) is glass (2) wherein $B_2O_3$ is incorporated as an essential component (with the content of $B_2O_3$ exceeding 0 molar percent) and the content of $Li_2O$ is from 4 to 25 molar percent (but exceeds 3 weight percent). The incorporation of $B_2O_3$ enhances melt properties and more effectively suppresses bubbling of the glass during precision press molding, as is described further below.

Glass (2-3) is glass (2) wherein the $WO_3$ content is less than 15 weight percent and the $Li_2O$ content is from 4 to 25 molar percent (but exceeds 3 weight percent). The relative reduction in the amount of $WO_3$ effectively suppresses bubbling of the glass during precision press molding.

In glass (2), to maintain or enhance weatherability and stability while imparting a high refractive index and a high dispersion characteristic, the content of $Bi_2O_3$ is desirably kept to within from 0.5 to 15 molar percent in glasses (2-2) and (2-3). In each of glasses (2-1) to (2-3), the content of $B_2O_3$ desirably exceeds 2 molar percent but does not exceed 15 molar percent.

In glass (2) of the present invention, a high refractive index and high dispersion characteristics are desirable. The term "high refractive index" refers to a refractive index (nd) of from 1.75 to 2.0, for example, and the term "high dispersion characteristic" to an Abbé number (vd) of from 18 to 30.

The functions of the individual components of glass (2) will be described next. The functions of the individual components of glass (1) are identical. Unless specifically stated otherwise, the contents and combined quantities of the various components denote molar percentages.

$P_2O_5$ is an essential component forming a network former in the glass and imparting stability to the glass permitting manufacturing. However, when the content of $P_2O_5$ exceeds 30 molar percent, the glass transition temperature and sag temperature increase, the refractive index decreases, and the Abbé number increases. At a content of less than 16 molar percent, there is a strong tendency for the glass to devitrify and the glass becomes unstable. Thus, the $P_2O_5$ content is set to within the range of from 16 to 30 molar percent, preferably within the range of from 17 to 28 molar percent.

$Nb_2O_5$ is also an essential component of the present invention that is indispensable and performs an extremely important function in imparting characteristics such as a high refractive index and high dispersion to the glass without employing PbO. However, there are drawbacks in that when the quantity incorporated exceeds 25 molar percent, the glass transition temperature and sag temperature increase, stability deteriorates, high temperature melt properties deteriorate, and the glass tends to develop bubbles and coloration during precision press molding. When the quantity incorporated is less than 5 molar percent, the refractive index of the glass decreases and dispersion diminishes. Thus, the content of $Nb_2O_5$ suitably ranges from 5 to 25 molar percent, desirably from 10 to 25 molar percent, and preferably from 12 to 23 molar percent.

$WO_3$ is another essential component of the present invention that can effectively impart a low melting point and a high refractive index and a high dispersion characteristic to the glass without the use of PbO. $WO_3$ lowers the glass transition temperature and sag temperature of the glass in the same manner as alkali metal oxides while raising the refractive index. That is, $WO_3$ is another component that is essential to decreasing the glass transition temperature while maintaining a high refractive index characteristic (or increasing the refractive index while maintaining a low glass transition temperature). The introduction of a small quantity has the effect of markedly reducing the liquid-phase temperature (devitrification temperature) of the glass, thus permitting a reduction in the temperature of the glass melt flow, increasing working viscosity, and facilitating the obtaining of homogenous optical glass free of striae. Accordingly, the incorporation of an small quantity of $WO_3$ to obtain an optical glass material containing a large amount of high refractive index components and having a high refractive index and high dispersion even for an optical glass such as in the present invention results in not yielding the above-mentioned advantages in the manufacturing process of shaping glass in a molten state. However, materials containing tungsten compounds are characterized by being polyvalent, such as $W^{5+}$ (pentavalent) and $W^{6+}$ (hexavalent), and tend to change from one valence to another even in the air. Thus, at the temperatures reached by the glass material during precision press molding, that is, within the temperature range of from 400 to 800° C., the greater the amount of $WO_3$ that is incorporated, the more micro adhesion of the glass and mold contamination that occur with charge transfer between the glass and the pressing mold, causing the surface of the pressing mold to lose its smoothness. As a result, micro scars and the like remain on the optically functional surfaces (such as the optical surfaces of a lens) of the precision press-molded optical element, tending to deteriorate the smoothness of these surfaces. Thus, in the stable mass production of a glass material for precision press molding containing a large amount of high refractive index components and having a high refractive index and high dispersion even for an optical glass such as in the present invention, the incorporation of a large quantity of tungsten is undesirable. For the above-stated reasons, $WO_3$ is a highly important component requiring the exercise of great care in setting the quantity incorporated into the glass. As a result, there are desirable upper and lower limits to the quantity incorporated. Specifically, a range of 1 to 40 molar percent is desirable, a range of 2 to 40 molar percent is preferred, a range of 2.5 to 30 molar percent is of greater preference, a range of 2.5 to 20 molar percent is of still greater preference, a range of 2.5 to 15 molar percent is of yet greater preference, and a range of 2.5 to 10 molar percent is of particular preference. In glasses (1-3) and (2-3), the quantity of $WO_3$ is set to less than 15 weight percent. In glasses (1-1), (1-2), (2-1), and (2-2), the quantity of $WO_3$ that is desirably incorporated is less than 15 weight percent. In each of glasses (1-1) to (2-3), the quantity of $WO_3$ that is desirably incorporated is less than or equal to 14.5 weight percent, preferably less than or equal to 14 weight percent, more preferably less than or equal to 12 weight percent, and still more preferably less than or equal to 10 weight percent. Lower limit given in weight percent, preferred is more than or equal to 1 weight percent, more preferred is more than or equal to 2 weight percent. To achieve an adequate $WO_3$ incorporation effect, the ratio of W to the combined quantity of Nb, W, Ti, and Bi in the cationic ratio (W/(Nb+W+Ti+Bi)) is desirably greater than or equal to 0.035, preferably greater than or equal to 0.04, more preferably greater than or equal to 0.045, and still more preferably greater than or equal to 0.05. The upper limit of the W/(Nb+W+Ti+Bi) is about 0.2, preferably less than or equal to 0.17, more preferably less than or equal to 0.15, still more preferably less than or equal to 0.12, still further preferably less than or equal to 0.10.

$TiO_2$, another essential component of the present invention, has the effects of increasing the refractive index and dispersion property and enhancing the weatherability and thermal stability of the glass (against devitrification). The incorporation of a small quantity has the effect of markedly lowering the liquid-phase temperature (devitrification temperature) of the glass, thus permitting a reduction in the temperature of the glass melt flow, increasing working viscosity, and facilitating the obtaining of a homogenous optical glass free of striae. Accordingly, the incorporation of an excessively small quantity of $TiO_2$ to obtain an optical glass material containing a large amount of high refractive index components and having a high refractive index and high dispersion even for an optical glass such as in the present invention results in not yielding the above-mentioned advantages in the manufacturing process of shaping glass in a molten state. To solve such problems, $TiO_2$ is indispensable to the glass. However, at a content of less than 1 molar percent, the refractive index and dispersion of the glass decrease and there is a risk of deterioration of glass stability. When the content exceeds 10 molar percent, the thermal stability of the glass deteriorates sharply, and the sag temperature and liquid-phase temperature increase abruptly. Thus, the quantity incorporated is limited to within the range of from 1 to 10 molar percent, desirably to within the range of from 2 to 8 molar percent.

$Bi_2O_3$, a further essential component of the present invention, effectively imparts a high refractive index and a high dispersion property to the glass and increases the stability of the glass. The incorporation of a small quantity of $Bi_2O_3$ has the effect of markedly lowering the liquid-phase temperature (devitrification temperature) of the glass, thus permitting a reduction in the temperature of the glass melt flow, increasing working viscosity, and facilitating the obtaining of homogenous optical glass free of striae. Accordingly, the incorporation of an excessively small quantity of $Bi_2O_3$ to obtain an optical glass material containing a large amount of high refractive index components and having a high refractive index and high dispersion even for an optical glass such as in the present invention results in not yielding the above-mentioned advantages in the manufacturing process of shaping glass in a molten state. To solve such problems, $Bi_2O_3$ is indispensable to the glass. $Bi_2O_3$ affords the following advantages. When glass melt is caused to flow out of a pipe made of platinum alloy, for example, for extended periods, the surface of the pipe becomes coarse and minute irregularities develop, sometimes disrupting the flow of glass. When forming preforms for precision press molding from a glass flow, the disruption of the glass flow causes the development of striae, resulting in defective product. However, the surface of a pipe through which glass containing $Bi_2O_3$ flows remains smooth and does not lose its luster even over extended periods. Further, even when the above irregularities are present, the flow of glass containing $Bi_2O_3$ has the effect of restoring metallic luster to the pipe surface. By exploiting this effect, it is possible to prevent the generation of striae and manufacture high-quality preforms for precision press molding with high efficiency. Glass containing $Bi_2O_3$ also has the property of tending not to wet the outer perimeter of the flowpipe. Glass that wets the outer perimeter becomes denatured, and when this denatured glass is picked up in the glass melt flow, the quality of the preform drops. The incorporation of $Bi_2O_3$ reduces wetting of the outer perimeter by the glass and prevents such reduction in the quality of the preform. When forming preforms by dripping glass from a pipe, wetting of the outer perimeter of the pipe by the glass sometimes decreases the weight precision of the preform. Adding $Bi_2O_3$ to the glass reduces such wetting, permitting the formation of a preform of high weight precision. For these reasons, $Bi_2O_3$ is an indispensable component that is incorporated in a quantity exceeding 4 percent when denoted as a weight percentage and in a quantity of greater than or equal to 0.5 percent when denoted as a molar percentage. However, when the quantity incorporated exceeds 15 molar percent, damage of the platinum alloy pipe flowing glass melt becomes remarkable and the glass tends to develop color. When the quantity incorporated is less than 0.5 molar percent, the refractive index decreases and dispersion drops. Thus, the $Bi_2O_3$ content suitably falls within a range of from 0.5 to 15 molar percent, desirably 1 to 15 molar percent, preferably a range exceeding 2 molar percent but not exceeding 15 molar percent, and still more preferably a range exceeding 2 molar percent but not exceeding 10 molar percent. However, in glasses (1-1) and (2-1), a quantity of $Bi_2O_3$ exceeding 4 weight percent is incorporated to further increase weatherability and stability. In glasses (1-2), (1-3), (2-1), and (2-3), $Bi_2O_3$ is incorporated in a quantity exceeding 4.5 weight percent and desirably greater than or equal to 5 percent.

When the combined quantity of $Nb_2O_5$, $WO_3$, $TiO_2$, and $Bi_2O_3$ exceeds 45 molar percent, although a high refractive index and a high dispersion characteristic are achieved, the glass melt tends to develop color and thermal stability deteriorates. When this combined quantity is reduced to less than 25 molar percent, targeted optical characteristics such as the refractive index and dispersion are not achieved. Thus, the combined quantity of $Nb_2O_5$, $WO_3$, $TiO_2$, and $Bi_2O_3$ is set to within a range of from 25 to 45 molar percent, preferably a range of from 27 to 42 molar percent.

Alkali metal oxides such as $Li_2O$, $Na_2O$, and $K_2O$ are all components incorporated to improve the resistance to devitrification of the glass, decrease the sag temperature and liquid-phase temperature, and enhance the high temperature melt properties of the glass. Therefore, $Li_2O$ is incorporated in a quantity exceeding 3 weight percent but not exceeding 15 weight percent, desirably exceeding 3 weight percent but less than 15 weight percent, and preferably from 3.1 to 14.5 weight percent. Denoted as molar percentages, the quantity of $Li_2O$ incorporated is greater than or equal to 2 molar percent, desirably greater than or equal to 4 molar percent, and the quantity of $Na_2O$ incorporated is greater than or equal to 4 molar percent. A combined quantity of $Li_2O$, $Na_2O$, and $K_2O$ is preferably more than or equal to 25 molar percent, more preferably more than or equal to 30 molar percent, still more preferably more than or equal to 32 molar percent. However, when $Li_2O$ and $Na_2O$ are each incorporated in quantities exceeding 25 molar percent and $K_2O$ is incorporated in a quantity exceeding 15 molar percent, not only does the stability of the glass deteriorate, but the targeted high refractive index and high dispersion characteristic are precluded. Even when a combined quantity of $Li_2O$, $Na_2O$, and $K_2O$ of 42 molar percent or more is incorporated, not only does the stability of the glass deteriorate, but obtaining the targeted high refractive index and high dispersion characteristic is precluded. Thus, the quantity of $Li_2O$ incorporated is preferably set to from 4 to 25 molar percent, the quantity of $Na_2O$ incorporated set to from 4 to 25 molar percent, and the quantity of $K_2O$ incorporated set to from 0 to 15 molar percent, with the combined quantity of $Li_2O$, $Na_2O$, and $K_2O$ incorporated being set to less than or equal to 42 molar percent, desirably less than 42 molar percent, and the quantity of $Li_2O$ incorporated desirably being set to from 4 to 25 molar percent, the quantity of $Na_2O$ incorporated to from 5 to 20 molar percent, and the quantity of $K_2O$ incorporated to from 1 to 15 molar percent. The preferred range of the combined quantity of $Li_2O$, $Na_2O$, and $K_2O$ incorporated is desirably less than or equal to 38 molar percent, with ranges of $Li_2O$ of from 5 to 20 molar percent and $K_2O$ of from 1 to 8 molar percent being of greater preference.

Among the above alkali metal oxides, $Li_2O$ is the most effective at increasing the refractive index while lowering the glass transition temperature and sag temperature. Thus, $Li_2O$ is predominantly incorporated in the present invention. Although not quite to the same extent as $Li_2O$, $Na_2O$ is a component essential to obtaining the above-described effects, and is thus included along with $Li_2O$ as an essential component among the alkali metal oxides. However, since the viscosity of the glass tends to decrease as the amount of $Li_2O$ increases, shaping of the glass melt becomes difficult. To solve this problem and to make total properties of the glass suit for precision press molding, it is necessary to decrease the liquid-phase temperature of the glass, and then, impart increased working viscosity by lowering the working temperature, by incorporating small quantities of individual components that deteriorate the characteristics of glass for precision press molding due to adhesion of the glass to the pressing mold or damage to platinum alloys during precision press molding when incorporated in excessive quantities, such as the above-described $WO_3$, $TiO_2$, and $Bi_2O_3$. As a result, $Li_2O$ and $Na_2O$ in particular among the alkali metal oxides, and high refractive index components having the effect of lowering the liquid-phase temperature, namely, $WO_3$, $TiO_2$, and $Bi_2O_3$, are essential components of the glass for precision press molding of the present invention. To enhance the above-described effect of incorporating $Li_2O$, the proportion of $Li_2O$ in the alkali metal oxides in the glass, denoted as $Li_2O/(Li_2O+Na_2O+K_2O)$, is desirably greater than or equal to 0.4, preferably greater than or equal to 0.45, more preferably greater than or equal to 0.50, and still more preferably greater than or equal to 0.55.

Having $K_2O$ present with $TiO_2$ has the effect of suppressing coloration of the glass. Thus, in each of glasses (1-1) to (1-3) and (2-1) to (2-3), $K_2O$ is desirably incorporated as an essential component, desirably in a quantity of greater than or equal to 1 molar percent, preferably in the above-stated quantity of 1 to 15 molar percent, and more preferably in a quantity of 1 to 8 molar percent.

$B_2O_3$ is an extremely effective component for homogenizing and enhancing the melt properties of the glass. Further, the incorporation of a small quantity of $B_2O_3$ changes the bounding property of OH present within the glass and is extremely effective at preventing bubbling of the glass during pressing. However, when a quantity of $B_2O_3$ exceeding 15 molar percent is incorporated, it becomes necessary to incorporate a large quantity of $Nb_2O_5$ to maintain a high refractive index, rendering the glass extremely unstable. Thus, the quantity of $B_2O_3$ incorporated is set to from 0 to 15 molar percent, desirably from 1 to 15 molar percent, and preferably from 1 to 12 molar percent. However, to further enhance the above-described melt properties and antifoaming effect, $B_2O_3$ is added as an essential component to glasses (1-2) and (2-2). Further, 1-15 molar percent of $B_2O_3$ is desirably incorporated into each of glasses (1-1) to (2-3).

BaO is a component that effectively increases the refractive index of the glass, enhances devitrification stability, and lowers the liquid-phase temperature. Particularly when incorporating a large amount of $WO_3$, the incorporation of BaO suppresses coloration of the glass and effectively increases devitrification stability. However, when the quantity of BaO incorporated exceeds 15 molar percent, not only does the glass become unstable, but the transition temperature and sag temperature increase. Thus, the quantity of BaO incorporated is limited to from 0 to 15 molar percent, desirably to from 0 to 12 molar percent, and preferably to a quantity exceeding 0 but not exceeding 12 molar percent.

ZnO is a component incorporated to increase the refractive index and dispersion. The incorporation of a small quantity of ZnO has the effect of lowering the transition temperature, sag temperature, and liquid phase temperature. However, the incorporation of a large quantity results in marked deterioration of glass devitrification stability and runs the risk of raising the liquid-phase temperature. Accordingly, the quantity of ZnO incorporated is set to within a range of 0 to 12 molar percent, desirably 1 to 10 molar percent, and preferably 2 to 8 molar percent.

$Sb_2O_3$ and $As_2O_3$ are effective as glass clarifying agents. However, when either is added in a quantity exceeding 1 molar percent, the glass tends to bubble during precision press molding. Thus, the quantity incorporated is limited to less than or equal to 1 molar percent. Since $As_2O_3$ is toxic, it is desirably not added in consideration of its effect on the environment. Components such as $SiO_2$, $La_2O_3$, $Y_2O_3$, $Gd_2O_3$, $ZrO_2$, $Ta_2O_5$, $GeO_2$, CaO, MgO, and $Cs_2O$ may be incorporated in a combined quantity up to 2 molar percent to the extent that the object of the present invention is not compromised. However, $GeO_2$ is desirably not incorporated in consideration of its expensive cost and $Ta_2O_5$ is desirably not incorporated due to its expensive cost as well. PbO and CdO are desirably not incorporated due to their effects on the environment.

In glass (2), the combined quantity of the above components is greater than or equal to 98 percent. When the combined quantity of the above components is less than 98 molar percent, there is a risk of not achieving the various properties targeted by the present invention, such as a high refractive index, a high dispersion characteristic, a low softening property, and high stability. The combined quantity of the above components is desirably greater than or equal to 99 molar percent. The combined quantity of the above components without $As_2O_3$ desirably falls within the various above-stated ranges.

Preferred composition ranges are given below.

(Preferred Composition Range 1)

Glass (2) with 17 to 28 molar percent of $P_2O_5$, 10 to 25 molar percent of $Nb_2O_5$, 2 to 40 molar percent of $WO_3$, 2 to 8 molar percent of $TiO_2$, 1 to 15 molar percent of $Bi_2O_3$, with a combined quantity of $Nb_2O_5$, $WO_3$, $TiO_2$, and $Bi_2O_3$ of from 27 to 42 molar percent, 4 to 25 molar percent of $Li_2O$, 5 to 20 molar percent of $Na_{2O}$, 1 to 15 molar percent of $K_2O$, with the combined quantity of $Li_2O$, $Na_2O$ and $K_2O$ being less than or equal to 38 molar percent, 1 to 12 molar percent of $B_2O_3$, 0 to 12 molar percent of BaO, 1 to 10 molar percent of ZnO, 0 to 1 molar percent of $Sb_2O_3$, and 0 to 1 molar percent of $As_2O_3$, with the combined quantity of the above components being greater than or equal to 98 molar percent. Preferably, the content of $As_2O_3$ is 0 molar percent.

(Preferred Composition Range 2)

Glass (2) with 17 to 28 molar percent of $P_2O_5$, 12 to 23 molar percent of $Nb_2O_5$, 2.5 to 30 molar percent of $WO_3$, 2 to 8 molar percent of $TiO_2$, more than 2 but not more than 15 molar percent of $Bi_2O_3$, with a combined quantity of $Nb_2O_5$, $WO_3$, $TiO_2$, and $Bi_2O_3$ of from 27 to 42 molar percent, 5 to 20 molar percent of $Li_2O$, 5 to 20 molar percent of $Na_2O$, 1 to 8 molar percent of $K_2O$, with the combined quantity of $Li_2O$, $Na_2O$ and $K_2O$ being less than or equal to 38 molar percent, 1 to 12 molar percent of $B_2O_3$, 0 to 12 molar percent of BaO, 2 to 8 molar percent of ZnO, 0 to 1 molar percent of $Sb_2O_3$, and 0 to 1 molar percent of $As_2O_3$, with the combined quantity of the above components being greater than or equal to 98 molar percent. Preferably, the content of $As_2O_3$ is 0 molar percent.

(Preferred Composition Range 3)

Glass (2) with 17 to 28 molar percent of $P_2O_5$, 12 to 23 molar percent of $Nb_2O_5$, 2.5 to 30 molar percent of $WO_3$, 2 to 8 molar percent of $TiO_2$, more than 2 but not more than 10 molar percent of $Bi_2O_3$, with a combined quantity of $Nb_2O_5$, $WO_3$, $TiO_2$, and $Bi_2O_3$ of from 27 to 42 molar percent, 5 to 20 molar percent of $Li_2O$, 5 to 20 molar percent of $Na_2O$, 1 to 8 molar percent of $K_2O$, with the combined quantity of $Li_2O$, $Na_2O$ and $K_2O$ being less than or equal to 38 molar percent, 1 to 12 molar percent of $B_2O_3$, 0 to 12 molar percent of BaO, 2 to 8 molar percent of ZnO, 0 to 1 molar percent of $Sb_2O_3$, and 0 to 1 molar percent of $As_2O_3$, with the combined quantity of the above components being greater than or equal to 98 molar percent. Preferably, the content of $As_2O_3$ is 0 molar percent.

(Preferred Composition Range 4)

Glass (2) with 17 to 28 molar percent of $P_2O_5$, 12 to 23 molar percent of $Nb_2O_5$, 2.5 to 30 molar percent of $WO_3$, 2 to 8 molar percent of $TiO_2$, more than 2 but not more than 10 molar percent of $Bi_2O_3$, with a combined quantity of $Nb_2O_5$, $WO_3$, $TiO_2$, and $Bi_2O_3$ of from 27 to 42 molar percent, 5 to 20 molar percent of $Li_2O$, 5 to 20 molar percent of $Na_2O$, 1 to 8 molar percent of $K_2O$, with the combined quantity of $Li_2O$, $Na_2O$ and $K_2O$ being less than or equal to 38 molar percent, 1 to 12 molar percent of $B_2O_3$, more than 0 but not more than 12 molar percent of BaO, 2 to 8 molar percent of ZnO, 0 to 1 molar percent of $Sb_2O_3$, and 0 to 1 molar percent of $As_2O_3$, with the combined quantity of the above components being greater than or equal to 98 molar percent. Preferably, the content of $As_2O_3$ is 0 molar percent.

In each of preferred composition ranges 1 to 4, $WO_3$ is desirably incorporated in a quantity of 2.5 to 15 molar percent, preferably in a quantity of 2.5 to 10 molar percent, more preferably in a quantity of 2.5 to 9 molar percent, and still more preferably in a quantity of 2.5 to 8 molar percent. In each of preferred composition ranges 1 to 4, the combined quantity of $Li_2O$, $Na_2O$ and $K_2O$ is desirably incorporated in a quantity of 25 to 38 molar percent, preferably in a quantity of 30 to 38 molar percent, and more preferably in a quantity of 32 to 38 molar percent.

Each of the above preferred composition ranges is limited to the composition ranges of glasses (2-1) to (2-3), which are variations of glass (2). In each of the above preferred composition ranges, the combined quantity of the above-listed components is desirably greater than or equal to 99 percent, preferably 100 molar percent, with no $As_2O_3$ desirably being employed.

Glasses (1) and (2) with a glass transition temperature (Tg) of less than or equal to 530° C. and a sag temperature (Ts) of less than or equal to 560° C. are desirable as optical glass for precision press molding. These glasses preferably have a glass transition temperature (Tg) of less than or equal to 500° C. and a sag temperature (Ts) of less than or equal to 530° C. The glass transition temperature (Tg) of the glasses is more preferably less than 480° C., still more preferably less than or equal to 475° C.

Glass stability is important in the forming of preforms for press molding from glass melt while the glass is in a plastically deformable state. Glasses (1) and (2) desirably have liquid-phase temperatures of less than or equal to 970° C. to achieve good forming of such preforms.

(Method of Manufacturing Glasses (1) and (2))

As starting materials for glasses (1) and (2), $H_3PO_4$, metaphosphate, diphosphorus pentoxide, and the like may be employed for $P_2O_5$; $H_3BO_3$ and $B_2O_3$ may be employed for $B_2O_3$; and carbonates, nitrates, oxides and the like may be suitably employed for the other components. These starting materials are weighed out in a prescribed ratio and mixed for use as a mixed starting material. This mixed starting material is placed in a melting furnace that has been heated to 1,000 to 1,250° C.; melted, clarified, stirred, and homogenized; cast in a casting mold; and gradually cooled to obtain the low melting point, high refractive index, and high dispersion optical glass of the present invention.

Glass (1) desirably has a refractive index (nd) of 1.75 to 2.0 and an Abbé number (vd) of 18 to 30, and glass (2) desirably has a refractive index (nd) of 1.75 to 2.0 and an Abbé number (vd) of 18 to 30. To obtain glass (1) with a refractive index (nd) and Abbé number (vd) within the stated ranges, it suffices to set $Bi_2O_3$ to within a range of from 2 to 15 molar percent, set the combined quantity of $Nb_2O_5$, $WO_3$, $TiO_2$, and $Bi_2O_3$ to within a range of from 25 to 45 molar percent, for example, and adjust the quantities of the various components to obtain the targeted optical constants. To obtain glass (2) with a refractive index (nd) and Abbé number (vd) within the stated ranges, it suffices to suitably adjust the contents of the various components within the above-staged ranges. Since glasses (1) and (2) have a low melting property suited to precision press molding and good stability suited to the direct formation of preforms from glass melt gobs despite a high refractive index, it is more effective for the refractive index (nd) to be greater than 1.80, and still more effective for it to be greater than 1.83.

The present invention further covers preforms for precision press molding comprised of glasses (1) and (2). The term "precision press molding preform" means a molded member of glass equal in weight to the press-molded article. The method of manufacturing such preforms is identical to the method of manufacturing preforms for precision press molding, described further below.

[Precision Press Molding Preform and Method of Manufacturing the Same]

The precision press molding preform and method of manufacturing the same of the present invention will be described next. The term "precision press molding preform" means a molded member of glass equal in weight to the press-molded article. The preform is molded to a suitable shape based on the shape of the press-molded article; examples of such shapes are spherical and spheroidal. The preform is heated to a viscosity permitting press molding and supplied to press molding.

The shape of the preform, including the above-mentioned spheroidal shape, desirably has an axis of rotational symmetry. Examples of shapes having axes of rotational symmetry are shapes having smooth contour lines without angles or indentations in the cross-section containing the axis of rotational symmetry, such as shapes having a contour line in the form of an ellipse in which the minor axis corresponds to the axis of rotational symmetry in the above cross section. When one of the angles formed between a tangent to the contour line at a point on the contour line of the preform in the above cross-section and a line connecting that point on the contour line to the center of the preform along the axis of rotational symmetry is denoted as θ, as the point departs from the axis of rotational symmetry moving along the contour line, a shape in which θ increases monotonically from 90°, decreases monotonically, and then increases monotonically, becoming 90° at the other point where the contour line intersects the axis of rotational symmetry, is desirable.

The precision press molding preform of the present invention is as follows.

The first aspect of the precision press molding preform of the present invention is comprised of an optical glass having essential components in the form of $P_2O_5$, $Nb_2O_5$, $WO_3$, $TiO_2$, $Bi_2O_3$, $Li_2O$, and $Na_2O$; optional components in the form of $B_2O_3$, BaO, ZnO, $K_2O$, $Sb_2O_3$, and $As_2O_3$; where the content of $Bi_2O_3$ exceeds 4 weight percent but does not exceed 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30. The above quantity of $Bi_2O_3$ is desirably greater than or equal to 4.5 weight percent, preferably greater than or equal to 5 weight percent.

The second aspect is comprised of an optical glass having essential components in the form of $P_2O_5$, $Nb_2O_5$, $WO_3$, $TiO_2$, $Bi_2O_3$, $Li_2O$, $Na_2O$, and $B_2O_3$; optional components in the form of BaO, ZnO, $K_2O$, $Sb_2O_3$, and $As_2O_3$; where the content of $Bi_2O_3$ is from 0.5 to 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30. The quantity of $B_2O_3$ is desirably 1 to 15 molar percent, preferably 1 to 12 molar percent.

The third aspect thereof is comprised of an optical glass having essential components in the form of $P_2O_5$, $Nb_2O_5$, $WO_3$, $TiO_2$, $Bi_2O_3$, $Li_2O$, and $Na_2O$; comprising optional components in the form of $B_2O_3$, BaO, ZnO, $K_2O$, $Sb_2O_3$, and $As_2O_3$; where the content of $WO_3$ is less than 15 weight percent; the content of $Bi_2O_3$ is from 0.5 to 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30. The above content of $WO_3$ is desirably less than or equal to 14.5 weight percent, preferably less than or equal to 14 weight percent.

In each of the above-stated first through third aspects, the content of $Li_2O$ of the glass desirably exceeds 3 weight percent with a desirable upper limit to the $Li_2O$ content of 15 weight percent. Further, preforms comprised of glass having composition ranges consisting of the overlapping portions of the composition ranges of the first and second aspects, preforms comprised of glass having composition ranges consisting of the overlapping portions of the composition ranges of the second and third aspects, preforms comprised of glass having composition ranges consisting of the overlapping portions of the composition ranges of the third and first aspects; and preforms comprised of glass having composition ranges consisting of the overlapping portions of the composition ranges of the first, second, and third aspects are of even greater preference.

The reasons for the composition limits, desirable composition ranges, and desirable ranges of the various characteristics of the preform of the present invention are identical to those given for glasses (1) and (2) above.

The surface of any of the various above-described preforms may be provided with a thin film such as a mold separation film as needed. Examples of mold separation films are carbon-containing films and self-assembled films. The preform permits the press molding of an optical element having desired optical constants.

The precision press molding preform of the present invention is produced by forming glass gobs of the above-stated composition from glass melt and solidifying them without mechanical processing following solidification. That is, the precision press molding preform of the present invention can be manufactured by separating a gob of glass melt of prescribed weight from a glass melt flow and cooling and solidifying the glass gob to form a preform comprised of the above-stated optical glass having the prescribed weight.

The above method affords the advantages of not requiring mechanical processing such as cutting, grinding, or polishing. In preforms requiring mechanical processing, annealing must be conducted prior to mechanical processing to reduce deformation of the glass to a degree where no damage results. The above method of manufacturing a preform does not require annealing to prevent damage, and permits the formation of preforms with smooth surfaces.

In the above method of manufacturing a preform, the preform is desirably molded while being floated by applying wind pressure from the perspective of imparting a smooth, clean surface. Further, a preform formed by solidifying glass the entire surface of which is in a molten state and a preform the surface of which is comprised of a free surface, that is, the entire surface of which is a free surface, are desirable. Further, preforms without cutting scars known as "shear marks" are desirable. Shear marks are generated during cutting with a blade as the glass melt flows out. When shear marks remain from the stage of molding a precision press-molded article, those portions become defects. Thus, it is desirable to eliminate shear marks from the preform stage. Examples of methods of separating the glass melt without producing shear marks and without employing a cutting blade include the method of causing the glass melt to drip from a flowpipe and the method of supporting the front end of a glass melt flow emerging from a flowpipe and then removing the support at a timing capable of separating a glass melt gob of prescribed weight (known as the drop-cut method). In the drop-cut method, the glass is separated at a constriction formed between the front end side and the flowpipe side of the glass melt flow, making it possible to obtain a glass melt gob of prescribed weight. The glass melt gob obtained is then molded into a suitable shape for feeding to press molding while in a softened state to obtain a preform.

In the above-described method of manufacturing a preform, a glass melt gob corresponding to one preform is separated and the glass gob is molded into a preform while at a temperature at or above the softening point of the glass gob. However, it is also possible to cause the molten glass to flow into a casting mold, mold a glass member comprised of the above-described optical glass, and subject the molded glass member to mechanical processing to obtain a preform of desired weight. Before subjecting the molded glass member to mechanical processing, it is desirable to conduct an adequate deformation-relieving treatment by annealing the glass.

[Optical Element and Method of Manufacturing the Same]

The optical element of the present invention is comprised of the above-described optical glass. It can be manufactured by heating and precision press molding the above-described preform.

The present invention provides an optical element having desired optical constants which, because it is comprised of optical glass, has the various characteristics (refractive index (nd) and Abbé number (vd)) of the above-described glass.

Examples of the optical element of the present invention are various lenses such as spherical lenses, aspherical lenses, and microlenses; diffraction gratings; lenses with diffraction gratings; lens arrays; and prisms. The optical element is desirably obtained by heat softening and precision press molding a preform.

Thin optical films such as antireflective films, fully reflective films, partially reflective films, and films having spectral characteristics can be formed on the optical element as needed.

The method of manufacturing an optical element of the present invention will be described next.

The method of manufacturing an optical element of the present invention is characterized in that a press molding preform comprised of the above-described optical glass or a press molding preform manufactured by the above-described method of manufacturing is heated and precision press molded.

The precision press molding method is also known as the mold optics forming method, and is well-known in the field of art of the present invention.

Any surface of an optical element that passes, refracts, diffracts, or reflects light traveling along the optical axis of an optical element is called an optically functional surface. Taking the example of a lens, surfaces such as the aspherical surface of an aspherical lens and the spherical surface of a spherical lens correspond to optically functional surfaces. The precision press-molding method precisely transfers the molding surface of a pressing mold to the glass, thereby forming an optically functional surface by press molding. There is no need to conduct mechanical processing such as grinding or polishing to finish an optically functional surface.

Accordingly, the method of the present invention is suited to the manufacturing of optical elements such as lenses, lens arrays, diffraction gratings, and prisms, and is optimal for the highly efficient manufacturing of aspherical lenses.

The method of manufacturing an optical element of the present invention permits the manufacturing of optical elements having the above-stated optical characteristics and permits the press molding of preforms of glass having a low glass transition temperature (Tg) at relatively low temperatures, thereby reducing the load on the molding surface of the pressing mold and extending the service life of the pressing mold. Since the glass constituting the preform is highly stable, devitrification of the glass is effectively prevented during the reheating and pressing steps. Further, the series of steps from melting the glass to obtaining the final product can be conducted with high efficiency.

Pressing molds the use of which is known in precision press molding, such as those made out of materials such as silicon carbide, ultra-hard materials, and stainless steel with a mold separation film applied on the molding surface, may be employed. Pressing molds made out of silicon carbide are preferred. Carbon-containing films, noble-metal alloy films, and the like may be employed as the mold separation film, with carbon-containing films being preferred from the perspective of durability and cost.

In phosphate glass containing high refractive index-imparting components, the glass reacts with the mold separation film, particularly carbon-containing films, on the surface of the pressing mold during precision press molding, generating scratches and bubbles on the surface of precision press-molded articles. However, the use of the above preform reduces or prevents the generation of such scratches and bubbles. The pressing mold is equipped with an upper mold and a lower mold and, as needed, a sleeve.

In precision press molding, a non-oxidizing gas is desirably employed as the atmosphere during molding to protect the molding surface of the pressing mold. Desirable non-oxidizing gases are nitrogen and a mixture of nitrogen and hydrogen.

A precision press molding method particularly suited to the method of manufacturing an optical element of the present invention will be described next.

(Precision Press Molding Method 1)

In this method, a press molding preform is introduced into a pressing mold, both the pressing mold and preform are heated together, and precision press molding is conducted (referred to as "precision press molding method 1).

In precision press molding method 1, both the pressing mold and the preform are desirably heated to a temperature at which the glass constituting the preform exhibits a viscosity of from $10^6$ to $10^{12}$ dPa·sec (poise) and precision press molding is conducted.

Cooling is then desirably conducted to a temperature at which the glass exhibits a viscosity of greater than or equal to $10^{12}$ dPa·sec, desirably greater than or equal to $10^{14}$ dPa·sec, and preferably greater than or equal to $10^{16}$ dPa·sec, after which the precision press-molded article is removed from the pressing mold.

The shape of the molding surface of the pressing mold can be precisely transferred to the glass and the precision press-molded article removed without deformation under the above-stated conditions.

(Precision Press Molding Method 2)

In this method, the pressing mold and the press molding preform are separately preheated, the preheated preform is introduced into the pressing mold, and precision press molding is conducted (referred to as "precision press molding method 2).

In precision press molding method 2, since the above-described preform is preheated prior to being introduced into the pressing mold, optical elements can be manufactured with good surface precision and without surface defects while decreasing the cycle time.

The temperature to which the pressing mold is preheated is desirably set lower than the temperature to which the preform is preheated. Preheating the pressing mold to a lower temperature reduces wear and tear on the mold.

In precision press molding method 2, the above-described preform is desirably heated to a temperature at which the glass constituting the preform exhibits a viscosity of less than or equal to $10^9$ dPa·sec, preferably $10^9$ dPa·sec.

The above-described preform is desirably preheated while being floated, and is preferably preheated to a temperature at which the glass constituting the preform exhibits a viscosity of from $10^{5.5}$ to $10^9$ dPa·sec, more preferably to a temperature of greater than or equal to $10^{5.5}$ dPa·sec and less than $10^9$ dPa·sec.

Cooling of the glass is desirably started either simultaneously with the start of pressing or during pressing.

The temperature of the pressing mold is adjusted lower than the temperature to which the preform is preheated; a temperature at which the glass exhibits a viscosity of from $10^9$ to $10^{12}$ dPa·sec can serve as a standard.

In this method, following press molding, mold separation is desirably conducted after cooling to a temperature at which the glass exhibits a viscosity of greater than or equal to $10^{12}$ dPa·sec.

The precision press-molded optical element is removed from the pressing mold and, as needed, gradually cooled. When the molded article is an optical element such as a lens, a thin optical film can be coated on the surface thereof.

EMBODIMENTS

Embodiments of the present invention are described below.

Embodiments 1 to 40

Table 1 gives the glass composition in molar percentages, refractive index (nd), Abbé number (vd), transition temperature (Tg), sag temperature (Ts), liquid phase temperature (L.T.), and specific gravity of each of the embodiments. Various corresponding oxides, hydroxides, carbonates, and nitrates were employed as the starting materials of the various components of each of the glasses. The starting materials were weighed out to yield the compositions shown in Table 1 following vitrification, thoroughly mixed, charged to a platinum crucible, melted at a temperature ranging from 1,000 to 1,250° C. in an electric furnace, homogenized by stirring, clarified, and then cast in a metal mold preheated to a suitable temperature. Once the cast glass had been cooled to the transition temperature, it was immediately placed in an annealing furnace and gradually cooled to room temperature, yielding the various optical glasses.

The refractive index (nd), Abbé number (vd), transition temperature (Tg), sag temperature (Ts), and liquid-phase temperature (L.T.) of the optical glasses obtained were measured as set forth below. The results are given in Tables 2 and 3. Table 4 gives the weight percentages converted from the compositions of the glasses shown in Table 1 above and Table 5 gives the cationic ratios given in percentage converted from the compositions of the glasses shown in Table 1.

(1) Refractive Index (nd) and Abbé Number (vd)

Measured for optical glass obtained at a gradual temperature cooling rate of −30° C./hour.

(2) Transition Temperature (Tg) and Sag Temperature (Ts)

Measured at a heating rate of 4° C./min with a thermo-mechanical analyzer made by Rigaku Denki K. K.

(3) Liquid-Phase Temperature (L.T.)

Glass samples weighing 50 g each were charged to platinum crucibles; melted by heating for about 15 to 60 minutes at about 1,100 to 1,200° C.; cooled to a temperature below glass transition temperature; and then reheated and maintained for 2 hours at a temperature of 880° C., 890° C., 900° C., 910° C., 920° C., 930° C., 940° C., or 950° C.; and cooled. The presence or absence of crystal precipitation was observed by microscopy, and the lowest temperature at which no crystals were observed was adopted as the liquid-phase temperature (L.T.).

(4) Specific Gravity

Calculated by Archimedes' method.

TABLE 1

| | Composition (molar %) | | | | | | | | | | | | | |
|---|---|---|---|---|---|---|---|---|---|---|---|---|---|---|
| No. | $P_2O_5$ | $Nb_2O_5$ | $WO_3$ | $TiO_2$ | $Bi_2O_3$ | $Nb_2O_5 + WO_3 +$ $TiO_2 + Bi_2O_3$ | $Li_2O$ | $Na_2O$ | $K_2O$ | $Li_2O + Na_2O +$ $K_2O$ | $Li_2O/(Li_2O +$ $Na_2O + K_2O)$ | $B_2O_3$ | BaO | ZnO | Total |
| 1 | 24 | 19 | 8 | 5 | 2 | 34 | 20 | 11 | 2 | 33 | 0.61 | 4 | 3 | 2 | 100 |
| 2 | 23 | 19 | 8 | 5 | 3 | 35 | 20 | 11 | 2 | 33 | 0.61 | 4 | 3 | 2 | 100 |
| 3 | 22 | 19 | 8 | 5 | 4 | 36 | 20 | 11 | 2 | 33 | 0.61 | 4 | 3 | 2 | 100 |
| 4 | 23 | 19 | 8 | 5 | 4 | 36 | 20 | 11 | 2 | 33 | 0.61 | 4 | 2 | 2 | 100 |
| 5 | 23 | 19 | 8 | 5 | 5 | 37 | 20 | 11 | 2 | 33 | 0.61 | 4 | 1 | 2 | 100 |
| 6 | 23 | 19 | 8 | 5 | 6 | 38 | 18 | 13 | 2 | 33 | 0.55 | 4 | 0 | 2 | 100 |
| 7 | 22 | 19 | 8 | 5 | 6 | 38 | 15 | 15 | 4 | 34 | 0.44 | 4 | 0 | 2 | 100 |
| 8 | 23 | 19 | 8 | 5 | 4 | 36 | 18 | 15 | 2 | 35 | 0.51 | 4 | 0 | 2 | 100 |
| 9 | 23 | 19 | 4 | 5 | 8 | 36 | 18 | 15 | 2 | 35 | 0.51 | 4 | 0 | 2 | 100 |
| 10 | 23 | 19 | 6 | 5 | 6 | 36 | 18 | 13 | 2 | 33 | 0.55 | 4 | 4 | 0 | 100 |
| 11 | 23 | 18 | 5 | 5 | 5 | 33 | 18 | 18 | 0 | 36 | 0.5 | 4 | 2 | 2 | 100 |

TABLE 1-continued

| No. | P$_2$O$_5$ | Nb$_2$O$_5$ | WO$_3$ | TiO$_2$ | Bi$_2$O$_3$ | Nb$_2$O$_5$ + WO$_3$ + TiO$_2$ + Bi$_2$O$_3$ | Li$_2$O | Na$_2$O | K$_2$O | Li$_2$O + Na$_2$O + K$_2$O | Li$_2$O/(Li$_2$O + Na$_2$O + K$_2$O) | B$_2$O$_3$ | BaO | ZnO | Total |
|---|---|---|---|---|---|---|---|---|---|---|---|---|---|---|---|
| 12 | 23 | 21 | 6 | 3 | 6 | 36 | 18 | 15 | 2 | 35 | 0.51 | 4 | 0 | 2 | 100 |
| 13 | 23 | 19 | 8 | 3 | 6 | 36 | 18 | 15 | 2 | 35 | 0.51 | 4 | 0 | 2 | 100 |
| 14 | 23 | 19 | 10 | 1 | 6 | 36 | 18 | 15 | 2 | 35 | 0.51 | 4 | 0 | 2 | 100 |
| 15 | 24 | 18 | 6 | 5 | 6 | 35 | 18 | 15 | 2 | 35 | 0.51 | 4 | 0 | 2 | 100 |
| 16 | 24 | 18 | 5 | 6 | 4 | 33 | 20 | 13 | 2 | 35 | 0.57 | 4 | 2 | 2 | 100 |
| 17 | 24 | 18 | 5 | 6 | 4 | 33 | 20 | 15 | 2 | 37 | 0.54 | 4 | 2 | 0 | 100 |
| 18 | 24 | 18 | 5 | 6 | 4 | 33 | 20 | 17 | 2 | 39 | 0.51 | 4 | 0 | 0 | 100 |
| 19 | 24 | 18 | 5 | 5 | 5 | 33 | 20 | 15 | 2 | 37 | 0.54 | 4 | 2 | 0 | 100 |
| 20 | 24 | 18 | 5 | 6 | 4 | 33 | 20 | 15 | 2 | 37 | 0.54 | 4 | 1 | 1 | 100 |
| 21 | 24 | 18 | 5 | 5 | 3 | 31 | 20 | 15 | 2 | 37 | 0.54 | 4 | 2 | 2 | 100 |
| 22 | 24 | 18 | 5 | 5 | 2 | 30 | 20 | 14 | 2 | 36 | 0.56 | 4 | 3 | 3 | 100 |
| 23 | 24 | 18 | 5 | 5 | 3 | 31 | 20 | 14 | 2 | 36 | 0.56 | 5 | 2 | 2 | 100 |
| 24 | 24 | 19 | 5 | 5 | 4 | 33 | 20 | 13 | 2 | 35 | 0.57 | 4 | 2 | 2 | 100 |
| 25 | 26 | 19 | 5 | 5 | 4 | 33 | 20 | 13 | 2 | 35 | 0.57 | 4 | 1 | 1 | 100 |
| 26 | 27 | 19 | 5 | 5 | 4 | 33 | 20 | 13 | 2 | 35 | 0.57 | 4 | 1 | 0 | 100 |
| 27 | 25 | 19 | 5 | 5 | 4 | 33 | 20 | 13 | 2 | 35 | 0.57 | 5 | 1 | 1 | 100 |
| 28 | 25 | 19 | 5 | 5 | 4 | 33 | 19 | 13 | 2 | 34 | 0.56 | 4 | 2 | 2 | 100 |
| 29 | 26 | 19 | 5 | 5 | 4 | 33 | 18 | 13 | 2 | 33 | 0.55 | 4 | 2 | 2 | 100 |
| 30 | 24 | 19 | 5 | 5 | 4 | 33 | 20 | 13 | 2 | 35 | 0.57 | 6 | 1 | 1 | 100 |
| 31 | 24 | 19 | 5 | 5 | 4 | 33 | 20 | 13 | 2 | 35 | 0.57 | 7 | 1 | 0 | 100 |
| 32 | 24 | 19 | 6 | 6 | 8 | 39 | 18 | 11 | 2 | 31 | 0.58 | 4 | 2 | 0 | 100 |
| 33 | 24 | 20 | 6 | 5 | 8 | 39 | 18 | 13 | 2 | 33 | 0.55 | 4 | 0 | 0 | 100 |
| 34 | 24 | 18 | 6 | 6 | 9 | 39 | 18 | 13 | 2 | 33 | 0.55 | 4 | 0 | 0 | 100 |
| 35 | 24 | 19 | 5 | 5 | 4 | 33 | 20 | 13 | 2 | 35 | 0.57 | 5 | 2 | 1 | 100 |
| 36 | 24 | 19 | 6 | 5 | 4 | 34 | 20 | 13 | 2 | 35 | 0.57 | 5 | 2 | 0 | 100 |
| 37 | 24 | 18 | 6 | 6 | 4 | 34 | 20 | 13 | 2 | 35 | 0.57 | 4 | 2 | 1 | 100 |
| 38 | 25 | 19 | 6 | 5 | 4 | 34 | 21 | 12 | 2 | 35 | 0.6 | 4 | 1 | 1 | 100 |
| 39 | 25 | 19 | 6 | 5 | 4 | 34 | 20 | 12 | 2 | 34 | 0.59 | 4 | 2 | 1 | 100 |
| 40 | 24 | 18 | 5 | 5 | 3 | 31 | 20 | 13 | 2 | 35 | 0.57 | 6 | 2 | 2 | 100 |

TABLE 2

| No. | Specific gravity | T g (° C.) | T s (° C.) | n d | ν d | Liquid phase temperature (° C.) |
|---|---|---|---|---|---|---|
| 1 | 3.803 | 466 | 519 | 1.84541 | 23.15 | 900 |
| 2 | 3.905 | 461 | 515 | 1.86007 | 22.74 | 920 |
| 3 | 4.009 | 454 | 508 | 1.87427 | 22.37 | 940 |
| 4 | 3.967 | 460 | 516 | 1.86996 | 22.38 | 930 |
| 5 | 4.027 | 453 | 505 | 1.8794 | 22.04 | 920 |
| 6 | 4.086 | 448 | 497 | 1.88863 | 21.73 | 920 |
| 7 | 4.079 | 445 | 496 | 1.87915 | 21.77 | 930 |
| 8 | 3.913 | 453 | 504 | 1.86137 | 22.37 | 920 |
| 9 | 4.115 | 452 | 502 | 1.8847 | 21.88 | 940 |
| 10 | 4.086 | 458 | 505 | 1.87644 | 22.38 | 920 |
| 11 | 3.938 | 443 | 492 | 1.85136 | 21.86 | 920 |
| 12 | 4.037 | 449 | 498 | 1.87988 | 22.04 | 930 |
| 13 | 4.066 | 443 | 495 | 1.870148 | 22.33 | 920 |
| 14 | 4.117 | 441 | 492 | 1.86783 | 22.58 | 920 |
| 15 | 3.981 | 442 | 493 | 1.86026 | 22.61 | 920 |
| 16 | 3.835 | 452 | 500 | 1.84594 | 23.2 | 910 |
| 17 | 3.805 | 462 | 516 | 1.83927 | 23.32 | 910 |
| 18 | 3.752 | 450 | 497 | 1.834 | 23.28 | 910 |
| 19 | 3.885 | 449 | 497 | 1.84422 | 23.31 | 910 |
| 20 | 3.795 | 453 | 505 | 1.84017 | 23.23 | 900 |

TABLE 3

| No. | Specific gravity | T g (° C.) | T s (° C.) | n d | ν d | Liquid phase temperature (° C.) |
|---|---|---|---|---|---|---|
| 21 | 3.741 | 451 | 502 | 1.82602 | 23.96 | 900 |
| 22 | 3.692 | 457 | 508 | 1.81892 | 24.35 | 900 |
| 23 | 3.735 | 460 | 511 | 1.82674 | 23.97 | 900 |
| 24 | 3.851 | 452 | 504 | 1.84979 | 23.1 | 900 |
| 25 | 3.783 | 455 | 507 | 1.83979 | 23.3 | 900 |
| 26 | 3.757 | 466 | 518 | 1.83435 | 23.46 | 900 |
| 27 | 3.791 | 461 | 514 | 1.84257 | 23.23 | 900 |
| 28 | 3.832 | 458 | 510 | 1.84575 | 23.2 | 900 |
| 29 | 3.818 | 462 | 515 | 1.84195 | 23.29 | 900 |
| 30 | 3.794 | 454 | 507 | 1.84503 | 23.12 | 900 |
| 31 | 3.772 | 461 | 515 | 1.84224 | 23.17 | 900 |
| 32 | 4.194 | 460 | 513 | 1.90015 | 21.51 | 900 |
| 33 | 4.152 | 456 | 512 | 1.89836 | 21.41 | 900 |
| 34 | 4.208 | 452 | 505 | 1.89648 | 21.48 | 900 |
| 35 | 3.827 | 460 | 513 | 1.84706 | 23.16 | 900 |
| 36 | 3.846 | 455 | 506 | 1.84995 | 23.04 | 900 |
| 37 | 3.857 | 454 | 506 | 1.84928 | 23 | 900 |
| 38 | 3.83 | 456 | 504 | 1.84980 | 22.95 | 890 |
| 39 | 3.854 | 458 | 505 | 1.85054 | 23.01 | 890 |
| 40 | 3.727 | 450 | 503 | 1.82732 | 23.92 | 890 |

TABLE 4

| | Composition (Weight %) | | | | | | | | | | | |
|---|---|---|---|---|---|---|---|---|---|---|---|---|
| No. | P$_2$O$_5$ | Nb$_2$O$_5$ | WO$_3$ | TiO$_2$ | Bi$_2$O$_3$ | Li$_2$O | Na$_2$O | K$_2$O | B$_2$O$_3$ | BaO | SnO | Total |
| 1 | 24.3 | 36.0 | 13.2 | 2.8 | 6.7 | 4.3 | 4.9 | 1.3 | 2.0 | 3.3 | 1.2 | 100.0 |
| 2 | 22.8 | 35.2 | 12.9 | 2.8 | 9.8 | 4.2 | 4.8 | 1.3 | 1.9 | 3.2 | 1.1 | 100.0 |
| 3 | 21.3 | 34.4 | 12.7 | 2.7 | 12.7 | 4.1 | 4.7 | 1.3 | 1.9 | 3.1 | 1.1 | 100.0 |
| 4 | 22.3 | 34.5 | 12.7 | 2.7 | 12.7 | 4.1 | 4.6 | 1.3 | 1.9 | 2.1 | 1.1 | 100.0 |
| 5 | 21.8 | 33.7 | 12.4 | 2.7 | 15.6 | 4.0 | 4.5 | 1.3 | 1.9 | 1.0 | 1.1 | 100.0 |
| 6 | 21.3 | 32.9 | 12.1 | 2.6 | 18.2 | 3.5 | 5.3 | 1.2 | 1.8 | 0.0 | 1.1 | 100.0 |
| 7 | 20.3 | 32.8 | 12.0 | 2.6 | 18.1 | 2.9 | 6.0 | 2.4 | 1.8 | 0.0 | 1.1 | 100.0 |
| 8 | 22.5 | 34.8 | 12.8 | 2.7 | 12.8 | 3.7 | 6.4 | 1.3 | 1.9 | 0.0 | 1.1 | 100.0 |
| 9 | 21.1 | 32.6 | 6.0 | 2.6 | 24.1 | 3.5 | 6.0 | 1.2 | 1.8 | 0.0 | 1.1 | 100.0 |
| 10 | 21.3 | 33.0 | 9.1 | 2.6 | 18.2 | 3.5 | 5.3 | 1.2 | 1.8 | 4.0 | 0.0 | 100.0 |
| 11 | 22.8 | 33.4 | 8.1 | 2.8 | 16.3 | 3.7 | 7.8 | 0.0 | 1.9 | 2.1 | 1.1 | 100.0 |
| 12 | 21.2 | 36.3 | 9.0 | 1.6 | 18.2 | 3.5 | 6.1 | 1.2 | 1.8 | 0.0 | 1.1 | 100.0 |
| 13 | 21.3 | 33.0 | 12.1 | 1.6 | 18.3 | 3.5 | 6.1 | 1.2 | 1.8 | 0.0 | 1.1 | 100.0 |
| 14 | 20.9 | 32.4 | 14.9 | 0.5 | 17.9 | 3.4 | 6.0 | 1.2 | 1.8 | 0.0 | 1.0 | 100.0 |
| 15 | 22.9 | 32.2 | 9.3 | 2.7 | 18.8 | 3.6 | 6.2 | 1.3 | 1.9 | 0.0 | 1.1 | 100.0 |
| 16 | 24.3 | 34.1 | 8.3 | 3.4 | 13.3 | 4.2 | 5.7 | 1.3 | 2.0 | 2.2 | 1.2 | 100.0 |
| 17 | 24.4 | 34.2 | 8.3 | 3.4 | 13.3 | 4.3 | 6.6 | 1.3 | 2.0 | 2.2 | 0.0 | 100.0 |
| 18 | 24.7 | 34.6 | 8.4 | 3.5 | 13.5 | 4.3 | 7.6 | 1.4 | 2.0 | 0.0 | 0.0 | 100.0 |
| 19 | 23.7 | 33.3 | 8.1 | 2.8 | 16.2 | 4.1 | 6.5 | 1.3 | 1.9 | 2.1 | 0.0 | 100.0 |
| 20 | 24.5 | 34.4 | 8.3 | 3.4 | 13.4 | 4.3 | 6.7 | 1.3 | 2.0 | 1.1 | 0.6 | 100.0 |
| 21 | 25.0 | 35.1 | 8.5 | 2.9 | 10.3 | 4.4 | 6.8 | 1.4 | 2.1 | 2.3 | 1.2 | 100.0 |
| 22 | 25.6 | 35.9 | 8.7 | 3.0 | 7.0 | 4.5 | 6.5 | 1.4 | 2.1 | 3.5 | 1.8 | 100.0 |
| 23 | 25.0 | 35.1 | 8.5 | 2.9 | 10.3 | 4.4 | 6.4 | 1.4 | 2.6 | 2.2 | 1.2 | 100.0 |
| 24 | 24.0 | 35.5 | 8.2 | 2.8 | 13.1 | 4.2 | 5.7 | 1.3 | 2.0 | 2.1 | 1.1 | 100.0 |
| 25 | 25.9 | 35.4 | 8.1 | 2.8 | 13.1 | 4.2 | 5.6 | 1.3 | 1.9 | 1.1 | 0.6 | 100.0 |
| 26 | 26.8 | 35.2 | 8.1 | 2.8 | 13.0 | 4.2 | 5.6 | 1.3 | 1.9 | 1.1 | 0.0 | 100.0 |
| 27 | 25.0 | 35.6 | 8.2 | 2.8 | 13.1 | 4.2 | 5.7 | 1.3 | 2.4 | 1.1 | 0.6 | 100.0 |
| 28 | 24.8 | 35.2 | 8.1 | 2.8 | 13.0 | 4.0 | 5.6 | 1.3 | 2.0 | 2.1 | 1.1 | 100.0 |
| 29 | 25.6 | 35.0 | 8.0 | 2.8 | 12.9 | 3.7 | 5.6 | 1.3 | 1.9 | 2.1 | 1.1 | 100.0 |
| 30 | 24.1 | 35.8 | 8.2 | 2.8 | 13.2 | 4.2 | 5.7 | 1.3 | 3.0 | 1.1 | 0.6 | 100.0 |
| 31 | 24.2 | 35.8 | 8.2 | 2.8 | 13.2 | 4.2 | 5.7 | 1.3 | 3.5 | 1.1 | 0.0 | 100.0 |
| 32 | 21.2 | 31.5 | 8.7 | 3.0 | 23.2 | 3.3 | 4.3 | 1.2 | 1.7 | 1.9 | 0.0 | 100.0 |
| 33 | 21.2 | 33.1 | 8.7 | 2.5 | 23.2 | 3.4 | 5.0 | 1.2 | 1.7 | 0.0 | 0.0 | 100.0 |
| 34 | 21.2 | 29.8 | 8.7 | 3.0 | 26.1 | 3.3 | 5.0 | 1.2 | 1.7 | 0.0 | 0.0 | 100.0 |
| 35 | 24.0 | 35.5 | 8.2 | 2.8 | 13.1 | 4.2 | 5.7 | 1.3 | 2.4 | 2.2 | 0.6 | 100.0 |
| 36 | 23.7 | 35.2 | 9.7 | 2.8 | 13.0 | 4.2 | 5.6 | 1.3 | 2.4 | 2.1 | 0.0 | 100.0 |
| 37 | 24.0 | 33.7 | 9.8 | 3.4 | 13.1 | 4.2 | 5.7 | 1.3 | 2.0 | 2.2 | 0.6 | 100.0 |
| 38 | 24.8 | 35.2 | 9.7 | 2.8 | 13.0 | 4.4 | 5.2 | 1.3 | 1.9 | 1.1 | 0.6 | 100.0 |
| 39 | 24.6 | 34.9 | 9.6 | 2.8 | 12.9 | 4.1 | 5.1 | 1.3 | 1.9 | 2.2 | 0.6 | 100.0 |
| 40 | 25.0 | 35.1 | 8.5 | 2.9 | 10.3 | 4.4 | 5.9 | 1.4 | 3.1 | 2.2 | 1.2 | 100.0 |

TABLE 5

| | Composition (Cationic %) | | | | | | | | | | | | |
|---|---|---|---|---|---|---|---|---|---|---|---|---|---|
| No. | P | Nb | W | Ti | Bi | W/(Nb + W + Ti + Bi) | Li | Na | K | B | Ba | Zn | Total |
| 1 | 26.4 | 20.9 | 4.4 | 2.7 | 2.2 | 0.146 | 22 | 12.1 | 2.2 | 4.4 | 1.6 | 1.1 | 100.0 |
| 2 | 25.3 | 20.9 | 4.4 | 2.7 | 3.3 | 0.141 | 22 | 12.1 | 2.2 | 4.4 | 1.6 | 1.1 | 100.0 |
| 3 | 24.2 | 20.9 | 4.4 | 2.7 | 4.4 | 0.136 | 22 | 12.1 | 2.2 | 4.4 | 1.6 | 1.1 | 100.0 |
| 4 | 25.1 | 20.7 | 4.4 | 2.7 | 4.4 | 0.137 | 21.9 | 12 | 2.2 | 4.4 | 1.1 | 1.1 | 100.0 |
| 5 | 25 | 20.7 | 4.4 | 2.7 | 5.4 | 0.133 | 21.7 | 12 | 2.2 | 4.3 | 0.5 | 1.1 | 100.0 |
| 6 | 24.9 | 20.5 | 4.3 | 2.7 | 6.5 | 0.126 | 19.4 | 14.1 | 2.2 | 4.3 | 0 | 1.1 | 100.0 |
| 7 | 23.8 | 20.6 | 4.3 | 2.7 | 6.5 | 0.126 | 16.2 | 16.2 | 4.3 | 4.3 | 0 | 1.1 | 100.0 |
| 8 | 24.9 | 20.5 | 4.3 | 2.7 | 4.3 | 0.135 | 19.5 | 16.2 | 2.2 | 4.3 | 0 | 1.1 | 100.0 |
| 9 | 24.3 | 20.1 | 2.1 | 2.7 | 8.5 | 0.063 | 19 | 15.9 | 2.1 | 4.2 | 0 | 1.1 | 100.0 |
| 10 | 24.9 | 20.5 | 3.2 | 2.7 | 6.5 | 0.097 | 19.4 | 14.1 | 2.2 | 4.3 | 2.2 | 0 | 100.0 |
| 11 | 24.7 | 19.3 | 2.7 | 2.7 | 5.4 | 0.09 | 19.3 | 19.4 | 0 | 4.3 | 1.1 | 1.1 | 100.0 |
| 12 | 24.3 | 22.2 | 3.2 | 1.6 | 6.4 | 0.096 | 19 | 15.9 | 2.1 | 4.2 | 0 | 1.1 | 100.0 |
| 13 | 24.6 | 20.3 | 4.3 | 1.6 | 6.4 | 0.132 | 19.3 | 16 | 2.1 | 4.3 | 0 | 1.1 | 100.0 |
| 14 | 24.6 | 20.3 | 5.4 | 0.5 | 6.4 | 0.166 | 19.3 | 16 | 2.1 | 4.3 | 0 | 1.1 | 100.0 |
| 15 | 25.7 | 19.2 | 3.2 | 2.7 | 6.4 | 0.102 | 19.3 | 16 | 2.1 | 4.3 | 0 | 1.1 | 100.0 |
| 16 | 25.9 | 19.5 | 2.7 | 3.2 | 4.3 | 0.091 | 21.6 | 14.1 | 2.2 | 4.3 | 1.1 | 1.1 | 100.0 |
| 17 | 25.7 | 19.2 | 2.7 | 3.2 | 4.3 | 0.092 | 21.4 | 16 | 2.1 | 4.3 | 1.1 | 0 | 100.0 |
| 18 | 25.4 | 19.1 | 2.6 | 3.2 | 4.2 | 0.089 | 21.2 | 18 | 2.1 | 4.2 | 0 | 0 | 100.0 |
| 19 | 25.5 | 19.1 | 2.7 | 2.7 | 5.3 | 0.091 | 21.3 | 15.9 | 2.1 | 4.3 | 1.1 | 0 | 100.0 |
| 20 | 25.7 | 19.3 | 2.7 | 3.2 | 4.3 | 0.092 | 21.4 | 16 | 2.1 | 4.3 | 0.5 | 0.5 | 100.0 |
| 21 | 25.8 | 19.3 | 2.7 | 2.7 | 3.2 | 0.097 | 21.5 | 16.1 | 2.2 | 4.3 | 1.1 | 1.1 | 100.0 |
| 22 | 26.1 | 19.6 | 2.7 | 2.7 | 2.2 | 0.099 | 21.7 | 15.2 | 2.2 | 4.4 | 1.6 | 1.6 | 100.0 |
| 23 | 25.8 | 19.3 | 2.7 | 2.7 | 3.2 | 0.097 | 21.5 | 15 | 2.2 | 5.4 | 1.1 | 1.1 | 100.0 |
| 24 | 25.8 | 20.4 | 2.7 | 2.7 | 4.3 | 0.09 | 21.5 | 14 | 2.1 | 4.3 | 1.1 | 1.1 | 100.0 |
| 25 | 27.6 | 20.2 | 2.7 | 2.7 | 4.3 | 0.09 | 21.3 | 13.8 | 2.1 | 4.3 | 0.5 | 0.5 | 100.0 |

TABLE 5-continued

| | Composition (Cationic %) | | | | | | | | | | | | |
|---|---|---|---|---|---|---|---|---|---|---|---|---|---|
| No. | P | Nb | W | Ti | Bi | W/(Nb + W + Ti + Bi) | Li | Na | K | B | Ba | Zn | Total |
| 26 | 28.6 | 20.1 | 2.7 | 2.6 | 4.2 | 0.091 | 21.2 | 13.8 | 2.1 | 4.2 | 0.5 | 0 | 100.0 |
| 27 | 26.6 | 20.2 | 2.7 | 2.7 | 4.3 | 0.09 | 21.3 | 13.8 | 2.1 | 5.3 | 0.5 | 0.5 | 100.0 |
| 28 | 26.9 | 20.4 | 2.7 | 2.7 | 4.3 | 0.09 | 20.4 | 14 | 2.1 | 4.3 | 1.1 | 1.1 | 100.0 |
| 29 | 27.9 | 20.4 | 2.7 | 2.7 | 4.3 | 0.09 | 19.4 | 14 | 2.1 | 4.3 | 1.1 | 1.1 | 100.0 |
| 30 | 25.5 | 20.2 | 2.7 | 2.7 | 4.3 | 0.09 | 21.3 | 13.8 | 2.1 | 6.4 | 0.5 | 0.5 | 100.0 |
| 31 | 25.4 | 20.1 | 2.7 | 2.6 | 4.2 | 0.091 | 21.2 | 13.8 | 2.1 | 7.4 | 0.5 | 0 | 100.0 |
| 32 | 25.8 | 20.4 | 3.2 | 3.2 | 8.6 | 0.09 | 19.4 | 11.8 | 2.2 | 4.3 | 1.1 | 0 | 100.0 |
| 33 | 25.4 | 21.2 | 3.2 | 2.6 | 8.5 | 0.09 | 19 | 13.8 | 2.1 | 4.2 | 0 | 0 | 100.0 |
| 34 | 25.5 | 19.2 | 3.2 | 3.2 | 9.6 | 0.091 | 19.1 | 13.8 | 2.1 | 4.3 | 0 | 0 | 100.0 |
| 35 | 25.7 | 20.3 | 2.7 | 2.7 | 4.3 | 0.09 | 21.4 | 13.9 | 2.1 | 5.3 | 1.1 | 0.5 | 100.0 |
| 36 | 25.7 | 20.3 | 3.2 | 2.7 | 4.3 | 0.105 | 21.4 | 13.9 | 2.1 | 5.3 | 1.1 | 0 | 100.0 |
| 37 | 26 | 19.5 | 3.2 | 3.2 | 4.3 | 0.106 | 21.6 | 14.1 | 2.2 | 4.3 | 1.1 | 0.5 | 100.0 |
| 38 | 26.7 | 20.3 | 3.2 | 2.7 | 4.3 | 0.105 | 22.5 | 12.8 | 2.2 | 4.3 | 0.5 | 0.5 | 100.0 |
| 39 | 26.9 | 20.4 | 3.2 | 2.7 | 4.3 | 0.105 | 21.5 | 12.9 | 2.2 | 4.3 | 1.1 | 0.5 | 100.0 |
| 40 | 25.8 | 19.3 | 2.7 | 2.7 | 3.2 | 0.097 | 21.5 | 14 | 2.1 | 6.5 | 1.1 | 1.1 | 100.0 |

Embodiment 41

The clarified and homogenized glass melts corresponding to Embodiments 1 to 40 were made to flow at a constant rate from a platinum alloy pipe adjusted to a temperature falling within a temperature range permitting stable flow, a glass melt gob of the weight of the targeted preform was separated by dripping or the drop-cut method, the glass melt gob was received in a receiving mold having gas spray nozzles in the bottom, and a press molding preform was formed while blowing gas through the gas spray nozzles to float the glass gob. The separation interval of the glass melt was adjusted and set to obtain spherical preforms 2 to 30 mm in diameter. The weight of the preform was rendered precisely uniform with the setting value and all of the preforms had smooth surfaces.

Embodiment 42

Figure 1:
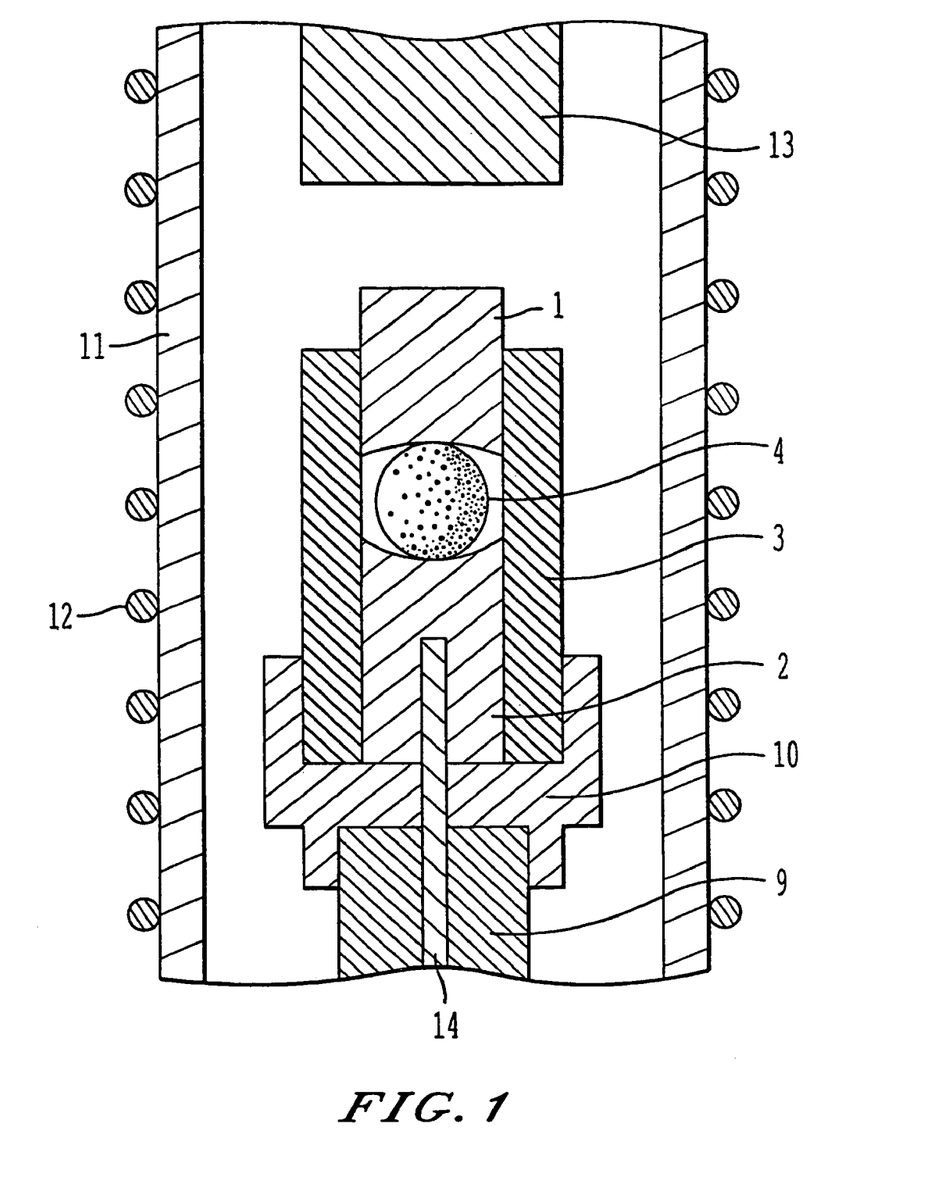
FIG. 1 is a schematic diagram of a pressing device for precision press molding aspherical lenses.

The preform obtained in Embodiment 41 was precision press molded in the pressing mold shown in FIG. 1 to obtain an aspherical lens. Specifically, the preform 4 was positioned between a lower mold 2 and an upper mold 1 and a guide mold 3, constituting the pressing mold, the pressing mold being positioned on a support base 10 provided on a support rod 9. Then, the interior of a quartz tube 11 was backfilled with a nitrogen atmosphere, and power was supplied to a heater 12 to heat the interior of quartz tube 11. The temperature on the interior of the pressing mold was adjusted to a temperature at which the glass being molded exhibited a viscosity of from $10^8$ to $10^{10}$ dPa·sec. The temperature within the mold is controlled by a thermocouple 14 inserted into the lower mold 2. While maintaining this temperature, a pressing rod 13 was lowered to press down upon upper mold 1, thereby pressing the preform 4 that had been positioned within the pressing mold. The pressure applied was 8 MPa and the pressing time was 30 seconds. Following pressing, the pressure was removed and the press-molded glass article was gradually cooled to a temperature at which the glass exhibited a viscosity of greater than or equal to $10^{12}$ dPa·sec with lower mold 2 and upper mold 1 still in contact. The press-molded glass article was then cooled to room temperature and removed from the pressing mold, yielding an aspherical lens. The aspherical lens obtained had extremely high surface precision.

An antireflective film may be provided as needed on an aspherical lens obtained by precision press molding.

Embodiment 43

The preform obtained in Embodiment 41 was preheated to a temperature at which the glass constituting the preform exhibited a viscosity of $10^8$ dPa·sec while floating the preform. A pressing mold comprised of an upper mold, lower mold, and sleeve was heated to a temperature at which the glass exhibited a viscosity of from $10^9$ to $10^{12}$ dPa·sec, the preheated preform was introduced into a cavity in the pressing mold, and precision press molding was conducted. The pressure applied was 10 MPa. Cooling of the glass and pressing mold was begun with the start of pressing. After cooling to a temperature at which the molded glass exhibited a viscosity of greater than or equal to $10^{12}$ dPa·sec, the molded article was removed from the mold, yielding an aspherical lens. The aspherical lens obtained had extremely high surface precision.

An antireflective film may be provided as needed on an aspherical lens obtained by precision press molding.

The present disclosure relates to the subject matter contained in Japanese Patent Application No. 2003-113282 filed on Apr. 17, 2003 and Japanese Patent Application No. 2003-304364 filed on Aug. 28, 2003, which is expressly incorporated herein by reference in its entirety.

What is claimed is:

1. An optical glass for precision press molding characterized by comprising essential components in the form of $P_2O_5$, $Nb_2O_5$, $WO_3$, $TiO_2$, $Bi_2O_3$, $Li_2O$, and $Na_2O$; comprising optional components in the form of $B_2O_3$, BaO, ZnO, $K_2O$, $Sb_2O_3$, and $As_2O_3$; where the content of $Bi_2O_3$ is equal to or greater than 0.5 molar percent, but does not exceed 15 molar percent; the content of $Li_2O$ is from 2 to 25 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (νd) is from 18 to 30.

2. A precision press molding preform comprised of the optical glass according to claim 1.

3. An optical element obtained by precision press molding the precision press molding preform according to claim 2.

4. A method of manufacturing an optical element characterized in that the precision press molding preform according to claim 2 is heated and precision press molded.

5. The method of manufacturing an optical element according to claim 4 wherein the preform is introduced into a pressing mold, both the pressing mold and preform are heated together, and precision press molding is conducted.

6. The method of manufacturing an optical element according to claim 4 wherein the pressing mold and preform are separately heated, the preheated preform is introduced into the pressing mold, and precision press molding is conducted.

7. A method of manufacturing a press molding preform characterized by comprising the steps of:
separating a prescribed weight of glass melt from a glass melt flow, and
forming a press molding preform comprised of this prescribed weight of the optical glass according to claim 1.

8. An optical element obtained by precision press molding a precision press molding preform manufactured by the method of manufacturing according to claim 7.

9. A method of manufacturing an optical element characterized in that a precision press molding preform manufactured by the method of manufacturing according to claim 7 is heated and precision press molded.

10. The method of manufacturing an optical element according to claim 9 wherein the preform is introduced into a pressing mold, both the pressing mold and preform are heated together, and precision press molding is conducted.

11. The method of manufacturing an optical element according to claim 9 wherein the pressing mold and preform are separately heated, the preheated preform is introduced into the pressing mold, and precision press molding is conducted.

12. An optical element comprised of the optical glass according to claim 1, which is in the form of a precision press-molded article.

13. An optical glass for precision press molding characterized by comprising essential components in the form of $P_2O_5$, $Nb_2O_5$, $WO_3$, $TiO_2$, $Bi_2O_3$, $Li_2O$, $Na_2O$, and $B_2O_3$; comprising optional components in the form of BaO, ZnO, $K_2O$, $Sb_2O_3$, and $As_2O_3$; where the content of $Bi_2O_3$ is from 0.5 to 15 molar percent; the content of $Li_2O$ is from 2 to 25 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30.

14. A precision press molding preform comprised of the optical glass according to claim 13.

15. An optical element obtained by precision press molding the precision press molding preform according to claim 14.

16. A method of manufacturing an optical element characterized in that the precision press molding preform according to claim 14 is heated and precision press molded.

17. The method of manufacturing an optical element according to claim 16 wherein the preform is introduced into a pressing mold, both the pressing mold and preform are heated together, and precision press molding is conducted.

18. The method of manufacturing an optical element according to claim 16 wherein the pressing mold and preform are separately heated, the preheated preform is introduced into the pressing mold, and precision press molding is conducted.

19. A method of manufacturing a press molding preform characterized by comprising the steps of:
separating a prescribed weight of glass melt from a glass melt flow, and
forming a press molding preform comprised of this prescribed weight of the optical glass according to claim 13.

20. An optical element obtained by precision press molding a precision press molding preform manufactured by the method of manufacturing according to claim 19.

21. A method of manufacturing an optical element characterized in that a precision press molding preform manufactured by the method of manufacturing according to claim 19 is heated and precision press molded.

22. The method of manufacturing an optical element according to claim 21 wherein the preform is introduced into a pressing mold, both the pressing mold and preform are heated together, and precision press molding is conducted.

23. The method of manufacturing an optical element according to claim 21 wherein the pressing mold and preform are separately heated, the preheated preform is introduced into the pressing mold, and precision press molding is conducted.

24. An optical element comprised of the optical glass according to claim 13, which is in the form of a precision press-molded article.

25. A precision press molding preform characterized:
by being comprised of an optical glass having essential components in the form of $P_2O_5$, $Nb_2O_5$, $WO_3$, $TiO_2$, $Bi_2O_3$, $Li_2O$, and $Na_2O$; optional components in the form of $B_2O_3$, BaO, ZnO, $K_2O$, $Sb_2O_3$, and $As_2O_3$; where the content of $Bi_2O_3$ is equal to or greater than 0.5 molar percent, but does not exceed 15 molar percent; the combined quantity of $Nb_2O_5$, $WO_3$, $TiO_2$, and $Bi_2O_3$ is from 25 to 45 molar percent; the combined quantity of $Li_2O$ $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30;
in that a gob of the glass in a molten state has been solidified; and
in that the preform has been shaped without mechanical processing.

26. An optical element obtained by precision press molding the precision press molding preform according to claim 25.

27. A method of manufacturing an optical element characterized in that the precision press molding preform according to claim 25 is heated and precision press molded.

28. The method of manufacturing an optical element according to claim 27 wherein the preform is introduced into a pressing mold, both the pressing mold and preform are heated together, and precision press molding is conducted.

29. The method of manufacturing an optical element according to claim 27 wherein the pressing mold and preform are separately heated, the preheated preform is introduced into the pressing mold, and precision press molding is conducted.

30. A preform for precision glass molding characterized:
by being comprised of an optical glass having essential components in the form of $P_2O_5$, $Nb_2O_5$, $WO_3$, $TiO_2$, $Bi_2O_3$, $Li_2O$, $Na_2O$, and $B_2O_3$; optional components in the form of BaO, ZnO, $K_2O$, $Sb_2O_3$, and $As_2O_3$; where the content of $Bi_2O_3$ is from 0.5 to 15 molar percent; the combined quantity of $Nb_2O_5$, $WO_3$, $TiO_2$, and $Bi_2O_3$ is from 25 to 45 molar percent; the combined quantity of $Li_2O$, $Na_2O$, and $K_2O$ is less than or equal to 42 molar percent; the combined quantity of the essential components and optional components is greater than or equal to 98 molar percent; the refractive index (nd) is from 1.75 to 2.0; and the Abbé number (vd) is from 18 to 30;

in that a gob of the glass in a molten state has been solidified; and in that the preform has been shaped without mechanical processing.

31. An optical element obtained by precision press molding the precision press molding preform according to claim 30.

32. A method of manufacturing an optical element characterized in that the precision press molding preform according to claim 30 is heated and precision press molded.

33. The method of manufacturing an optical element according to claim 32 wherein the preform is introduced into a pressing mold, both the pressing mold and preform are heated together, and precision press molding is conducted.

34. The method of manufacturing an optical element according to claim 32 wherein the pressing mold and preform are separately heated, the preheated preform is introduced into the pressing mold, and precision press molding is conducted.

* * * * *